US008165479B2

(12) United States Patent
Mizuno

(10) Patent No.: US 8,165,479 B2
(45) Date of Patent: Apr. 24, 2012

(54) PROCESSING APPARATUS, CONTROL METHOD AND STORAGE MEDIUM

(75) Inventor: Takafumi Mizuno, Higashimurayama (JP)

(73) Assignee: Canon Kabushiki Kaisha (JP)

( * ) Notice: Subject to any disclaimer, the term of this patent is extended or adjusted under 35 U.S.C. 154(b) by 502 days.

(21) Appl. No.: 12/417,003

(22) Filed: Apr. 2, 2009

(65) Prior Publication Data
US 2009/0254780 A1 Oct. 8, 2009

(30) Foreign Application Priority Data

Apr. 2, 2008 (JP) ................... 2008-096352

(51) Int. Cl.
G03G 15/00 (2006.01)
G06F 11/34 (2006.01)
(52) U.S. Cl. .............. 399/10; 709/224; 714/48
(58) Field of Classification Search ........... 399/10, 399/8, 9; 358/1.15; 709/224, 225, 226; 714/48, 714/E11.025, E11.204
See application file for complete search history.

(56) References Cited

U.S. PATENT DOCUMENTS 7,032,019 B1    4/2006 Noguchi et al.
7,613,404 B2 * 11/2009 Takeuchi et al. ............. 399/8

FOREIGN PATENT DOCUMENTS

JP    2001-147839 A      5/2001
JP    2007-328499 A   * 12/2007
JP    2009-048263 A   *  3/2009

* cited by examiner

Primary Examiner — Sophia S Chen
(74) Attorney, Agent, or Firm — Rossi, Kimms & McDowell LLP

(57) ABSTRACT

A processing apparatus that can accept logs from external processing apparatuses efficiently without degrading the performance of its own. The processing apparatus is connected with a plurality of external processing apparatuses for sending a first log including information on frequency of usage and a second log including information on an error, and collects the first and second logs from the external processing apparatuses. A receiving unit receives the first log sent from each of the external processing apparatuses. A calculation unit calculates a priority of each the external processing apparatuses based on the operating situation of each of the external processing apparatuses determined from the first log received by the receiving unit. A determination unit determines whether or not the second log sent by each of the external processing apparatuses should be stored based on the priority calculated by the calculation unit.

15 Claims, 16 Drawing Sheets

FIG. 3

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 08:25.41 | 50251 | COPY | 54 | 37 | 17 | 27 |
| 2007.10.5 | 09:33.52 | 10047 | PRINT | 14 | 0 | 14 | 0 |
| 2007.10.5 | 09:51.27 | 50251 | FAX | 4 | 4 | 0 | 0 |
| 2007.10.5 | 10:10.39 | 00844 | PRINT | 22 | 22 | 0 | 0 |
| 2007.10.5 | 10:24.16 | 42941 | SCAN | 15 | 15 | 0 | 27 |
| 2007.10.5 | 10:54.52 | 50251 | COPY | 118 | 10 | 108 | 59 |
| .... | .... | .... | .... | .... | .... | .... | .... |

FIG. 4A

```
==========Log==========
•MODEL NAME    IRXXXX
•CONT          ver 0.42
200X/06/01

==========Log==========

Time : ID 0.000.001  OS    initialize
0.000.521  DE    SRAM initialize
0.003.256  DE    NVRAM initialize
         ⋮
0.007.443  FAX   CCC initialize
         ⋮
0.009.294  SCAN  DDD initialize
         ⋮
0.130.382  PRINT EEE initialize
```

2402 — ·MODEL NAME / ·CONT
2403 — 0.000.001 OS initialize
2401

FIG. 4B

```
==========Log==========
•MODEL NAME    IRXXXX
•CONT          ver 0.42
200X/06/01

==========Log==========

Time : ID 0.000.001  OS    initialize 0.000.521  DE    SRAM initialize
     00000000 00000000 00000000 00000000
     00000000 00000000 00000000 00000000
     00000000 00000000 00000000 00000000
     00000000 00000000 00000000 00000000

0.003.256  DE    NVRAM initialize
     000000FF 0000001C 00012340 00000000
     00000000 00000000 00000000 00000000
     007771300 0BF 0000 00000000 00000000
     00000000 00000000 00000000 00000000
```

2405 — 0.000.001 OS initialize
2404

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 08:25.41 | 50251 | COPY | 54 | 37 | 17 | 27 |
| 2007.10.5 | 11:21.43 | 10047 | PRINT | 14 | 0 | 14 | 0 |
| 2007.10.5 | 14:11.52 | 50251 | FAX | 4 | 4 | 0 | 0 |
| 2007.10.5 | 15:12.32 | 00844 | PRINT | 20 | 20 | 0 | 0 |
| 2007.10.5 | 17:45.53 | 42941 | SCAN | 15 | 15 | 0 | 0 |
| 2007.10.5 | 19:36.25 | 50251 | COPY | 108 | 10 | 98 | 54 |

702

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 10:24.33 | 09204 | PRINT | 15 | 0 | 15 | 0 |
| 2007.10.5 | 14:18.37 | 33620 | FAX | 12 | 12 | 0 | 0 |

703

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 09:39.28 | 26721 | COPY | 150 | 40 | 110 | 0 |
| 2007.10.5 | 10:19.57 | 00673 | PRINT | 226 | 226 | 0 | 113 |

704

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 09:45.41 | 24078 | FAX | 11 | 11 | 0 | 0 |
| 2007.10.5 | 12:00.05 | 41787 | PRINT | 46 | 6 | 40 | 23 |
| 2007.10.5 | 13:36.37 | 41787 | FAX | 7 | 7 | 0 | 0 |
| 2007.10.5 | 17:51.21 | 10047 | PRINT | 84 | 22 | 62 | 42 |

| | 801 | 802 |
|---|---|---|
| | DEVICE | PRIORITY |
| 803 | A | 100 |
| 804 | B | 33.3 |
| 805 | C | 33.3 |
| 806 | D | 66.7 |

FIG. 10

| DATE | TIME | USER IDENTIFIER | TYPE | PAGE NUMBER | BLACK-AND-WHITE | COLOR | DOUBLE-SIDED |
|---|---|---|---|---|---|---|---|
| 2007.10.5 | 08:25.41 | 50251 | COPY | 36 | 36 | 0 | 0 |
| 2007.10.5 | 08:43.22 | 50251 | PRINT | 112 | 0 | 112 | 66 |
| 2007.10.5 | 08:51.53 | 50251 | FAX | 4 | 4 | 0 | 0 |
| 2007.10.5 | 09:04.31 | 50251 | FAX | 5 | 5 | 0 | 0 |
| 2007.10.5 | 09:08.15 | 50251 | COPY | 16 | 0 | 16 | 0 |
| 2007.10.5 | 09:15.55 | 50251 | COPY | 33 | 33 | 0 | 0 |
| 2007.10.5 | 09:31.35 | 50251 | PRINT | 108 | 8 | 100 | 54 |
| 2007.10.5 | 09:45.12 | 50251 | FAX | 7 | 7 | 0 | 0 |
| 2007.10.5 | 10:21.43 | 10047 | PRINT | 78 | 0 | 78 | 0 |
| 2007.10.5 | 11:51.53 | 50251 | FAX | 4 | 4 | 0 | 0 |
| 2007.10.5 | 15:12.32 | 00844 | SCAN | 10 | 10 | 0 | 0 |
| 2007.10.5 | 17:45.53 | 42941 | PRINT | 19 | 15 | 4 | 0 |
| 2007.10.5 | 19:36.25 | 50251 | COPY | 61 | 1 | 60 | 0 |

FIG. 11

| DEVICE | PRIORITY |
|---|---|
| A | 100 |
| B | 35 |
| C | 65 |
| D | 80 |

| | |
|---|---|
| THRESHOLD | $\theta = 70$ |
| CORRECTION VALUE FOR RETRANSMISSION | $\pi = 145$ |
| PANEL OPERATION CORRECTION VALUE | $\rho = -20$ |

FIG. 12B

| JOB TYPE | CORRECTION VALUE |
|---|---|
| COLOR | −15 |
| BW | −5 |
| FAX | −20 |
| PRINT | −10 |
| N IN 1 | −5 |

1205 — JOB TYPE; 1206 — CORRECTION VALUE

PER-JOB-TYPE CORRECTION TABLE

| | DEVICE | DATE | TIME |
|---|---|---|---|
| 1704 | C | 2007.10.5 | 11:24.55 |
| 1705 | A | 2007.10.5 | 13:10.00 |

| DEVICE | DATE | TIME |
|---|---|---|
| B | 2007.10.5 | 09:31.22 |
| D | 2007.10.5 | 11:11.02 |
| B | 2007.10.5 | 13:43.32 |
| B | 2007.10.5 | 14:11.24 |

PROCESSING APPARATUS, CONTROL METHOD AND STORAGE MEDIUM

BACKGROUND OF THE INVENTION

1. Field of the Invention

The present invention relates to a processing apparatus such as a copying machine having a function of collecting logs, a control method of the processing apparatus, and a storage medium storing therein a control program for executing the control method.

2. Description of the Related Art

An environment where a dedicated server is not placed and an image forming apparatus is used as a server so that a network can be operated without a dedicated server is becoming increasingly widespread in offices. In such a situation, an image forming apparatus (a master unit) having higher performance, for example, having a high-speed CPU or a high-capacity memory, has a server function, including a device management function of managing a plurality of image forming apparatus (slave units) on a network.

In such a device management for slave units by a master unit, logs are collected from the slave units. Logs include normal logs (job logs) such as the number of printed sheets, and error logs for identifying a failure when an error occurs. Since an error log includes a lot of information so as to identify a failure, the data of the log is large in size.

Since a storage area of a slave unit in which logs are memorized is generally small in size, when the storage area becomes full, the logs are removed in order of occurrence. Therefore, the slave unit cannot store many error logs. Accordingly, the slave unit has to send error logs to its master unit one by one every time an error occurs in order to prevent logs not stored in the slave unit from being cleared.

However, if the master unit unconditionally accepts large logs in size such as error logs from a plurality of slave units, the performance of the master unit itself may degrade. In order to address the problem, increasing the memory capacity of the slave units is difficult because of cost. Consequently, what is needed is a technique for collecting error logs efficiently even if there is only a given amount of memory for storing error logs.

The following prior art (network system) is known that performs such log collection (e.g., Japanese Laid-Open Patent Publication (Kokai) No. 2001-147839). This network system includes a plurality of slave units, and a master unit which collects logs from the slave units through a network. The master unit has a priority definition table in which the priorities of the slave units are defined. When the amount of logs stored in a slave unit reaches a predetermined amount, the master unit collects the logs only when the priority of the slave unit is higher than a preset priority. In addition, a priority is assigned to information contained in a log, and when the amount of logs stored in the slave unit reaches a predetermined amount, the master unit collects only logs whose priorities assigned to information are higher than a preset priority.

However, the above prior art relates to collection of logs to which a specified or higher priority is given, based on a static priority preset to individual slave units or information. Therefore, priorities cannot be set dynamically depending on the operating situations of the slave units. Further, in the situation in which the master unit itself has to perform various functions without degrading its performance, whether or not a log should be accepted cannot be determined dynamically depending on the condition of the master unit itself.

As just described, with the prior art, sufficiently efficient error log collection has not yet been realized.

SUMMARY OF THE INVENTION

The present invention provides a processing apparatus that can accept logs from external processing apparatuses efficiently without degrading the performance of the processing apparatus itself, a control method of the processing apparatus, and a storage medium that has a control program for executing the control method stored therein.

Accordingly, in a first aspect of the present invention, there is provided a processing apparatus which is connected with a plurality of external processing apparatuses for sending a first log including information on frequency of usage and a second log including information on an error, and collects the first and second logs from the external processing apparatuses comprising a receiving unit that receives the first log sent from each of the external processing apparatuses, a calculation unit that calculates a priority of each the external processing apparatuses based on the operating situation of each of the external processing apparatuses determined from the first log received by the receiving unit and a determination unit that determines whether or not the second log sent by each of the external processing apparatuses should be stored based on the priority calculated by the calculation unit.

In a second aspect of the present invention, there is provided a control method of a processing apparatus which is connected with a plurality of external processing apparatuses for sending a first log including information on frequency of usage and a second log including information on an error, and collects the first and second logs from the external processing apparatuses, wherein the method comprises a receiving step of receiving the first log sent from each of the external processing apparatuses, a calculation step of calculating a priority of each of the external processing apparatuses based on the operating situation of each of the external processing apparatuses determined from the first log received in the receiving step and a determination step of determining whether or not the second log sent by each of the external processing apparatuses should be stored based on the priority calculated in the calculation step.

In a third aspect of the present invention, there is provided a storage medium storing a computer readable control program therein to implement a control method of a processing apparatus which is connected with a plurality of external processing apparatuses for sending a first log including information on frequency of usage and a second log including information on an error, and collects the first and second logs from the external processing apparatuses, wherein the method comprises a receiving step of receiving the first log sent from each of the external processing apparatuses, a calculation step of calculating a priority of each of the external processing apparatuses based on the operating situation of each of the external processing apparatuses determined from the first log received in the receiving step and a determination step of determining whether or not the second log sent by each of the external processing apparatuses should be stored based on the priority calculated in the calculation step.

According to the present invention, processing apparatus can accept logs from external processing apparatuses efficiently without degrading the performance of the processing apparatus itself.

The features and advantages of the invention will become more apparent from the following detailed description taken in conjunction with the accompanying drawings.

BRIEF DESCRIPTION OF THE DRAWINGS

FIG. 3 is a table showing an example of a job log.

FIG. 4A is a diagram showing an example of an error log on which the operating situation of the image forming apparatus at the time of error occurrence is recorded.

FIG. 4B is a diagram showing another example of an error log on which the operating situation of the image forming apparatus at the time of error occurrence is recorded.

FIG. 6 is a table showing an example of job logs of slave units.

FIG. 10 is a table showing an example of a job log of the master unit.

FIG. 11 is a diagram showing an example of a priority table.

FIG. 12A is a diagram showing an example of a priority threshold and various correction values.

FIG. 12B is a diagram showing another example of a priority threshold and various correction values.

DETAILED DESCRIPTION OF THE PREFERRED EMBODIMENTS

The present invention will now be described in detail below with reference to the accompanying drawings showing preferred embodiments thereof.

[First Embodiment]
<Entire Configuration of Image Forming System>

Figure 1:
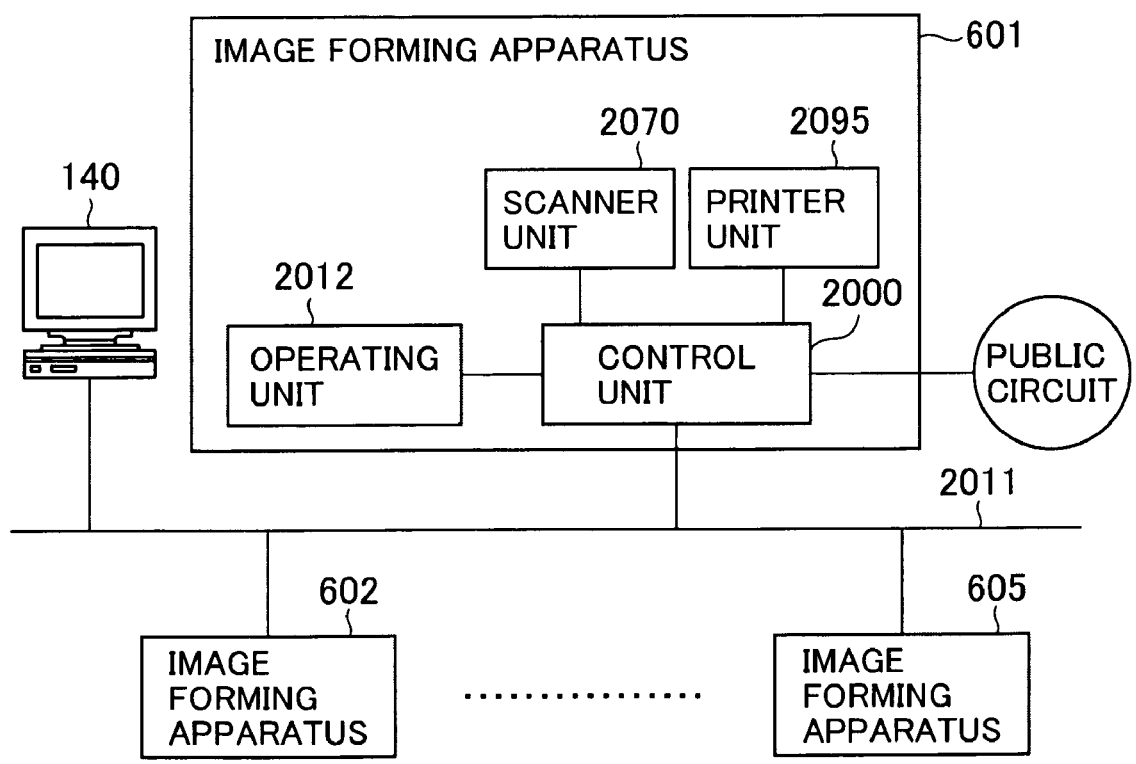
FIG. 1 is a block diagram showing the entire configuration of an image forming system including a processing apparatus according to an embodiment of the present invention.

FIG. 1 is a block diagram showing the entire configuration of an image forming system including a processing apparatus according to an embodiment of the present invention.

The image forming system has an image forming apparatus 601 connected to a LAN 2011. The image forming apparatus 601 is an example of a processing apparatus. The image forming apparatus 601 includes a scanner unit 2070 which is an image input device, a printer unit 2095 which is an image output device, a control unit 2000 and an operating unit 2012 which is a user interface.

The scanner unit 2070, the printer unit 2095 and the operating unit 2012 are connected to the control unit 2000, respectively. In this case, the control unit 2000 is connected to the LAN 2011 (network) and a public circuit. The image forming apparatus 601 can receive and send data, including color images, through the public circuit using G3 and G4 facsimile functions.

In addition to other image forming apparatuses 602 to 605, which are one example of external processing apparatuses, a personal computer (hereinafter referred to simply as "PC") 140 is also connected to the LAN 2011. The other image forming apparatuses 602 to 605 also have the similar configuration to that of the image forming apparatuses 601.

It should be noted that although the image forming apparatuses shown in FIG. 1 has both a printer function and a scanner function, the present invention may include image forming apparatuses having only one out of a printer function, a scanner function and a facsimile function.

<Configuration of Image Forming Apparatus>

Figure 2:
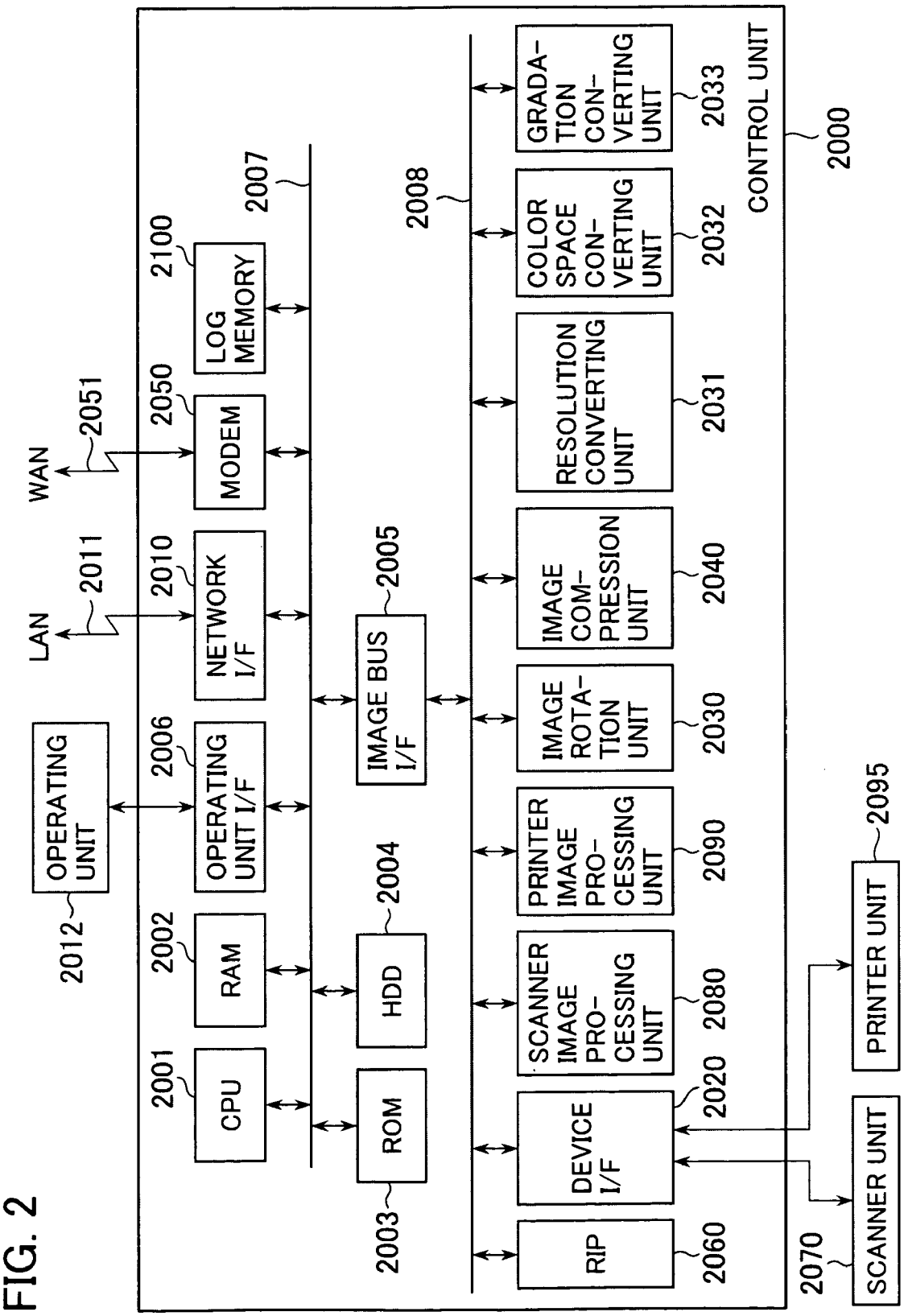
FIG. 2 is a block diagram showing the configuration of the image forming apparatus shown in FIG. 1.

FIG. 2 is a block diagram showing the configuration of the image forming apparatus shown in FIG. 1.

The control unit 2000 is connected to the scanner unit 2070 and the printer unit 2095, and controls the operation of them. The control unit 2000 is also connected to the LAN 2011 and a public circuit (WAN) 2051, and performs input/output of image information and device information through them.

The control unit 2000 has a CPU 2001, a RAM 2002, a ROM 2003 and an HDD 2004, which are connected to a system bus 2007.

The CPU 2001 controls the operation of the entire image forming apparatus. The RAM 2002 is a system work memory for the CPU 2001 to operate, and an image memory for temporarily storing image data. The RAM 2002 is also used to run a program such as an operating system, system software and application software. The ROM 2003 is a boot ROM, which stores a boot program of the system. The ROM 2003 sometimes stores system programs or application programs. The HDD 2004 is a hard disk drive, which stores system software, application software and image data. A small image forming apparatus may have a hard diskless configuration in which the HDD 2004 is not mounted and system software and application software are stored in the ROM 2003, which is not shown.

The control unit 2000 has a log memory 2100, an operating unit I/F 2006, a network I/F 2010 and a modem 2050, which are connected to the system bus 2007.

The log memory 2100 is a memory for storing logs, and stores various logs such as error logs and operating situations. The contents of a log will be described later. Without the log memory 2100, a portion of the RAM 2002 may be used as a log memory. The operating unit I/F 2006 is an interface with the operating unit 2012, and outputs to the operating unit 2012, image data displayed on the operating unit 2012. The operating unit I/F 2006 is also responsible for sending information inputted by the operation of the operating unit 2012 to the CPU 2001. The network I/F 2010 is connected to the LAN 2011 to input or output information through the LAN 2011. The modem 2050 is connected to the public circuit (WAN) 2051 to input or output image information through the public circuit (WAN) 2051.

The image bus I/F 2005 connects the system bus 2007 and an image bus 2008 for transferring image data at a high speed, and serves as a bus bridge for converting data structure. The image bus 2008 is composed of a PCI bus.

A raster image processor (RIP) 2060, a device I/F 2020, a scanner image processing unit 2080, and a printer image processing unit 2090 are connected to the image bus 2008.

The raster image processor (RIP) 2060 expands a PDL code to a bit map image. The device I/F 2020 connects the scanner unit 2070 and the printer unit 2095 to the controller 2000, and performs synchronous/asynchronous conversion of image data. The scanner image processing unit 2080 performs correction, processing, and editing on input image data. Further, the scanner image processing unit 2080 has a function of determining whether the input image is a color image or a black-and-white image based on the chroma signal of the image, and retaining the determination result. The printer image processing unit 2090 performs correction, processing, and editing on output image data.

An image rotation unit 2030, an image compression unit 2040, a resolution converting unit 2031, a color space converting unit 2032, and a gradation converting unit 2033 are connected to the image bus 2008.

The image rotation unit 2030 works with the scanner image processing unit 2080 to read images from the scanner unit 2070. The resolution converting unit 2031 converts the resolution of images. The color space converting unit 2032 converts the color space of images by a matrix operation. The gradation converting unit 2033 converts the gradation of images. The image compression unit 2040 compresses/decompresses images.

As described above, in the control unit 2000, image processing such as image rotation is performed by devices connected to the image bus 2008. Alternatively, image processing software may be stored on the HDD 2004 and the ROM 2003, and the program may be read in the RAM 2002 to be executed by the CPU 2001. It should be noted that software to be executed is not limited to those for image processing and it may be for other processing required by the image forming apparatus. Further, the software stored in the ROM 2003 may be executed without being read in the RAM 2002.

With reference to FIG. 2, it has been described that system software, application software and image data are stored on the HDD 2004. However, without being limited thereto, general data files other than images such as data for image management, and data managed by the image forming apparatus can be stored on the HDD 2004. The data managed by the image forming apparatus includes job logs for recording which user used which function and when.

In the image forming system having the above configuration, the image forming apparatus 601 is a master unit having a server function of collecting logs. The image forming apparatuses 602, 603, 604 and 605 are slave units to be managed whose logs are collected in the image forming apparatus 601. The image forming device 601, which is the master unit, is hereinafter referred to as a "master unit 601". The image forming apparatus 602, which is one of the slave units, is referred to as a "slave unit 602", and the same is applies to the other slave units 603 to 605. It should be noted that the slave units 602, 603, 604 and 605 may have no HDD 2004, or may have less memory capacity. Four slave units are presented in the present embodiment, but without being limited thereto.

<Logs in the Present Embodiment>

Logs in the present embodiment (first log, second log) will now be described.

There are two types of logs; one is a job log representing which user how many times (frequency of use) used which function and when. The other is an error log for identifying a failure when an error occurs. An error log includes call sequence information for internal module, which is needed to analyze an error when the error occurred, and memory dump result information at the time of the error occurrence. Since an error log contains such information, the error log is large in size. The job log is an example of a first log, and the error log is an example of a second log.

(A) Example of Log (I) Example of Job Log

An example of a job log will be described with reference to FIG. 3. FIG. 3 is a table showing an example of a job log.

As shown in FIG. 3, date information 501 and time information 502 which indicate when the job was processed, and a user identifier 503 which indicates who processed the job are recorded in the job log. Type information 504 which indicates what kind of processing was performed is also recorded in the job log. The type information 504 includes "Print" which indicates that printing from an application running on the PC 140 was preformed, "Copy" which indicates the copy function of the image forming apparatus was performed, "Scan" which indicates that an image was scanned, and "FAX" which indicates that facsimile transmission was made, for example.

Page number information 505 which indicates the number of pages needed for processing is recorded in the job log. Further, among the number of pages, black-and-white processed page number information 506, color processed page number information 507, double-sided processed page number information 508 and so on are recorded in the job log.

For example, the item at line 509 in FIG. 3 represents the fact that a user "50251" performed a copy function on "Oct. 5, 2007 at 08:25.41". It was recorded that 54 sheets of paper were copied at this moment, among of which 37 sheets were black-and-white-processed, 17 sheets were color-processed and 27 sheets were double-sided processed. The same applies to other lines.

The present embodiment lists eight kinds of items (501 to 508) as information contained in the job log. However, without being limited thereto, information contained in the job log may include other items, or, on the contrary, may include some of items selected from them.

(II) Example of Error Log

An example of an error log will be described with reference to FIGS. 4A and 4B. FIGS. 4A and 4B are diagrams showing an example of an error log on which the operating situation of the image forming apparatus at the time of error occurrence is recorded, respectively.

The header 2402 of the error log consists of the model name of the image forming apparatus "IRXXXX", the version of the system software "CONT ver 0.42", and the date when the error log information was obtained.

As information regarding operating procedure, time, the location of a block, the contents of an action and so on can be read, as shown at 2403 in FIG. 4A and at 2405 in FIG. 4B. Based on such information, the cause of error occurrence can be analyzed. In addition, according to the level of errors, error logs having different amount of information are created, such as simplified information 2401 and detailed information 2404.

(B) Collection of Logs

Figure 5:
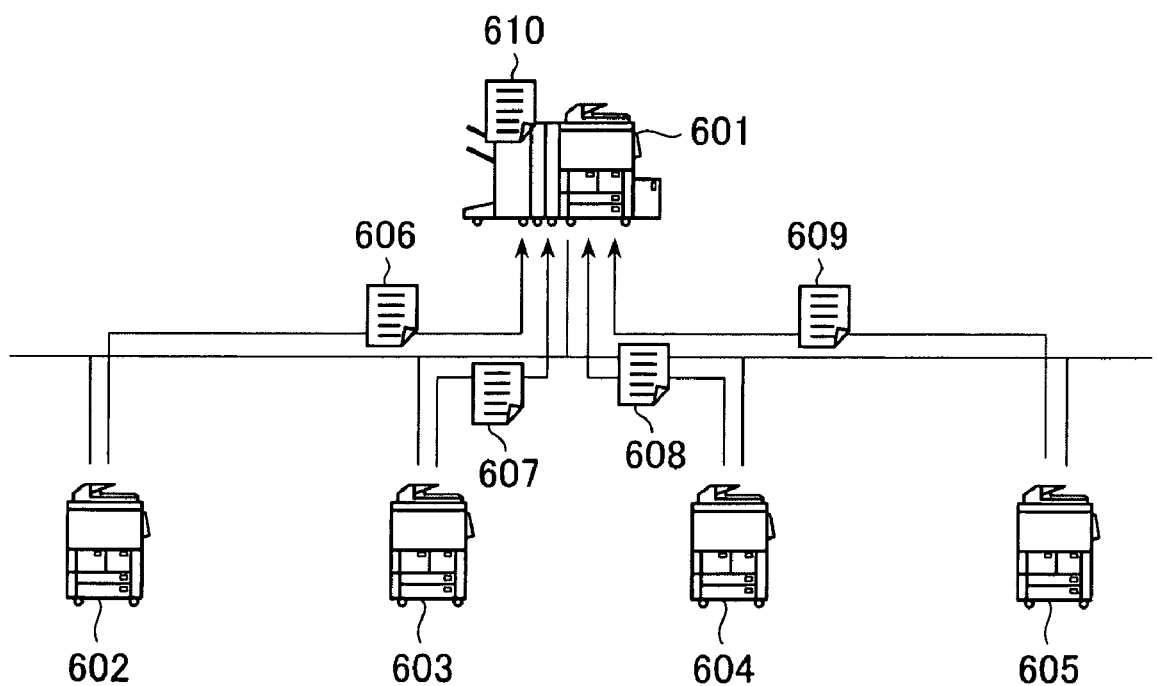
FIG. 5 is a conceptual diagram showing log collection by a master unit.

The collection of logs will be concretely described with reference to FIG. 5. FIG. 5 is a conceptual diagram showing log collection performed by the master unit.

In the example of FIG. 5, the slave units 602, 603, 604 and 605 send logs 606, 607, 608 and 609 to the master unit 601, respectively. The logs 606 to 609 may be job logs or error logs. The master unit 601 stores the logs from the slave units 602 to 605 on the HDD 2004. At this moment, instead of sending the main body of the log to the master unit 601 from the beginning, a log storage request may be first sent to the master unit 601 and the main body of the log may be sent after the request is permitted.

Since the master unit 601 itself also serves as the image forming apparatus, the master unit 601 has its own log. The master unit 601 collects its own logs 610. The logs of the master unit 601 itself are written on the HDD 2004 from the log memory 2100 regularly.

It should be noted that instead of a scheme in which the slave units 602 to 605 send their logs to the master unit 601, the master unit 601 may collect (derive) the logs from the slave units 602 to 605. For example, in the case of the job logs described above, the master unit 601 may access the slave units 602 to 605 regularly to collect logs.

Hereinafter, in the image forming system according to the present embodiment, after the master unit 601 establishes connection to the slave units 602 to 605 at a predetermined time, the slave units 602 to 605 send their job logs to the master unit 601. The master unit 601 receives the job logs. Error log transmission from the slave units 602 to 605 to the master unit 601 is carried out immediately after an error occurs (after an error log is generated). At this moment, the slave units 602 to 605 first send an error log storage request to the master unit 601. There are various ways of responses of the master unit 601 to an error log storage request, which will be described later.

Well known methods are used for setting the slave units 602 to 605 to be managed by the master unit 601, for example, methods in which the slave units 602 to 605 are registered with the master unit 601 in advance, or, when the slave units 602 to 605 are newly connected to a network, the presence of the slave units 602 to 605 themselves is broadcast to the master unit 601.

<Action of Master Unit>

The action of the master unit 601 will now be described.

The master unit 601 has a management function for managing the slave units 602 to 605, and serves as a server for collecting the logs of the slave units 602 to 605. In the present embodiment, although only a log collection function is presented as the management function of the master unit 601, the master unit 601 may have other management functions.

(A) Action of Collecting Job Logs

As described above, the master unit 601 collects, as logs, job logs and error logs. Job logs are collected regularly. The master unit 601 connects to the slave units 602 to 605 through the LAN 2011 at a predetermined time by using its own network I/F 2010.

When the slave units 602 to 605 detect the connection with the master unit 601, the slave units 602 to 605 use the network I/F 2010 to send their job logs stored in the log memory 2100 to the master unit 601 through the LAN 2011. The master unit 601 writes the received job logs into a predetermined storage location on the HDD 2004. Further, the job logs of the master unit 601 itself are read from the log memory 2100 of the master unit 601, and written into a predetermined storage location on the HDD 2004.

In this manner, the job logs of the slave units 602 to 605 and the master unit 601 itself, which are collected regularly, are saved on the HDD 2004 of the master unit 601.

(I) Grasp of Operating Situation of each Slave Unit

The master unit 601 determines the operating situation of each of the slave units 602 to 605 based on the job logs collected from the slave units 602 to 605. FIG. 6 is a table showing an example of job logs of slave units. An example of how to determine the operating situations from the collected job logs will now be described with reference to FIGS. 5 and 6.

The job logs 701, 702, 703 and 704 shown in FIG. 6 are obtained from the slave units 602, 603, 604 and 605, respectively, and stored on the HDD 2004 of the master unit 601. Each of the job logs 701 to 704 corresponds to the job log shown in FIG. 3. For ease of explanation, only job logs for one day are shown herein. Job logs for several days, not one day, may be stored on the HDD 2004 of the master unit 601. In this case, the master unit 601 may use stored job logs of the slave units for only one day (or for a predetermined number of days) in order to determine the operating situations of the slave units 602 to 605.

The operating situations of the slave units 602 to 605 are determined based on the number of times a user used the slave units 602 to 605. It can be seen from the job log 701 that the slave unit 602 was used six times in total, i.e., on "Oct. 5, 2007" at "8:25.41", "11:21.43", "14:11.52", "15:12.32", "17:45.53" and "19:36.25". Similarly, from the job log 702, it can be seen that the slave unit 603 was used twice, from the job log 703, the slave unit 604 was used twice, and from the job log 704, the slave unit 605 was used four times, respectively.

(II) Calculation of Priority Based on Operating Situation

The master unit 601 calculates the priorities of the slave units 602 to 605, based on the operating situations determined from the job logs 701 to 704. In order to calculate priorities, for example, each number of uses is divided by the maximum number of uses, and multiplied by 100. For the slave unit 602, the following may be obtained:

$$\alpha_{602} = \frac{6}{\max([6, 2, 2, 4])} \times 100 = 100$$

(max represents the maximum value in the collection) thus, the priority is 100. Similarly, for the slave units 603 and 604, the number of uses is two, thus their priorities are 33.3, and for the slave units 605, the number of uses is four, thus its priority is 66.7.

Instead of the above formula, other formulas may be used to determine priorities. Alternatively, not only with the number of uses, but also with total number of processed sheets may be used to determine priorities. Since the total number of processed sheets for each of the slave units 602, 603, 604 and 605 is 215, 27, 376 and 148, by using the above formula, the priority of the slave unit 602 can be determined as follows:

$$\alpha_{602} = \frac{215}{\max([215, 27, 376, 148])} \times 100 = 57.2$$

Similarly, the priorities of the slave units 603, 604 and 605 are 7.2, 100 and 39.4, respectively.

Alternatively, different weights may be assigned to each type of processing. For example, the weight 1 is assigned to "Print" indicating that a printing from an application running on the PC 140 is performed, and weight 1.3 is assigned to "Copy" indicating the copy function of the image forming apparatus is performed. Further, the weight 0.9 is assigned to "Scan" indicating that an image is scanned, and the weight 1.1 is assigned to "FAX" indicating that facsimile transmission is made. As a result, since the number of sheets for each of the slave units 602, 603, 604 and 605 after the weights are assigned is 262.5, 28.2, 421 and 149.8, by using the above formula, the priority of the slave unit 602 can be determined as follows:

$$\alpha_{602} = \frac{262.5}{\max([262.5, 28.2, 421, 149.8])} \times 100 = 62.4$$

Similarly, the priorities of the slave units 603, 604 and 605 are 6.7, 100 and 35.6, respectively.

In the present embodiment, although the priorities are determined based on only information in the job logs 701 to 704, weights can be applied to the priorities based on the specs of the slave units 602 to 605 (e.g., the number of processed sheets per unit of time), log memory capacity and so on. For example, a weight to increase the priority may be applied when the number of processed sheets per unit of time is less than a predetermined reference value, or when the log memory capacity is less than a predetermined reference value.

(III) Update of Priority Table

Figures 7, 8:
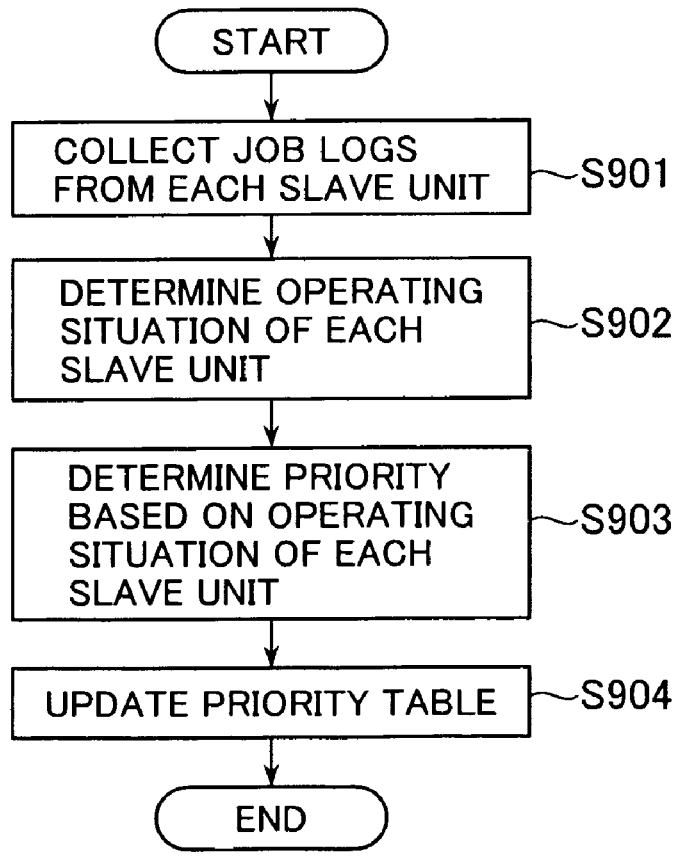
FIG. 7 is a diagram showing an example of a priority table.
FIG. 8 is a flowchart showing the flow of a process of collecting job logs and updating the priority table.

The priority table is updated based on the priorities determined in such a way. An example of a priority table will now be described with reference to FIG. 7. FIG. 7 is a diagram showing an example of a priority table.

As shown in FIG. 7, the priority table is comprised of a field 801 for identifying the slave units 602 to 605, and a priority field 802 for representing the priorities of the slave units 602 to 605.

In the example of FIG. 7, names A to D for identifying the slave units 602 to 605 are entered in the field 801. The device name A at line 803 in FIG. 7 represents the slave unit 602. Similarly, the device name B at line 804 represents the slave unit 603, the device name C at line 805 represents the slave unit 604, and the device name D at line 806 represents the slave unit 605, respectively. It should be noted that instead of such names A to D, various kinds of information for identifying the slave units 602 to 605 may available, such as IP addresses, as long as the information allows the slave units 602 to 605 to be identified uniquely.

In the priority field 802 in FIG. 7, the priorities based on the number of uses as described above are presented corresponding to device names A to D, respectively.

Creating a new priority table and updating a priority table caused by addition/removal of a slave unit can be performed in a variety of ways. For example, a scheme may be used in which a slave unit whose job log has been recorded on the HDD 2004 of the master unit 601 is added to the priority field 802, on the other hand, a slave unit whose job log has not been recorded on the HDD 2004 for a given period of time is removed from the priority field 802.

(IV) Process Flow

The flow of a process in which the master unit 601 collects job logs from the slave units 602 to 605 and updates the priority table as described above will now be described with reference to a flowchart of FIG. 8.

FIG. 8 is a flowchart showing the flow of a process of collecting job logs and updating the priority table. Each step in FIG. 8 is performed by running a program expanded into the RAM 2002 from the ROM 2003 by the CPU 2001 of the master unit 601.

First, in step S901, the CPU 2001 collects job logs from each of the slave units 602 to 605. In this case, it is assumed that the job logs 701 to 704 shown in FIG. 6 are collected. In the next step S902, the CPU 2001 determines the operating situations of the slave units 602 to 605 based on the job logs of the slave units 602 to 605 collected in step S901. For example, if the number of uses in the slave unit 602 is used as the operating situation, "6", which is the number of times the processes have been performed, is determined from the job log 701. Alternatively, if the total number of processed sheets is used as the operating situation, "215", which is the sum of the number of processed sheets for each process of the job log 701, represents the operating situation of the slave unit 602.

In step S903, the CPU 2001 determines the priorities based on the operating situation of each of the slave units 602 to 605. For example, as described above, the priorities can be determined by multiplying 100 to the value of the operating situation of each of the units 602 to 605 divided by the maximum value of the operating situations of all the slave units 602 to 605. The way to determine the operating situations and priorities described above is an example of the processing method in steps S902 and S903, and other calculation methods may be used.

In step S904, the CPU 2001 replaces the priorities of the slave units 602 to 605 in the priority table with the priorities determined in step S903.

(B) Action of Storing Job Logs

Next, the action of the master unit 601 of storing the error logs of the slave units 602 to 605 will be described. As described above, the action of error log transmission from the slave units 602 to 605 to the master unit 601 is made immediately after an error log is generated.

(1) Detail on determining whether or not Error Log should be Accepted

Figure 9:
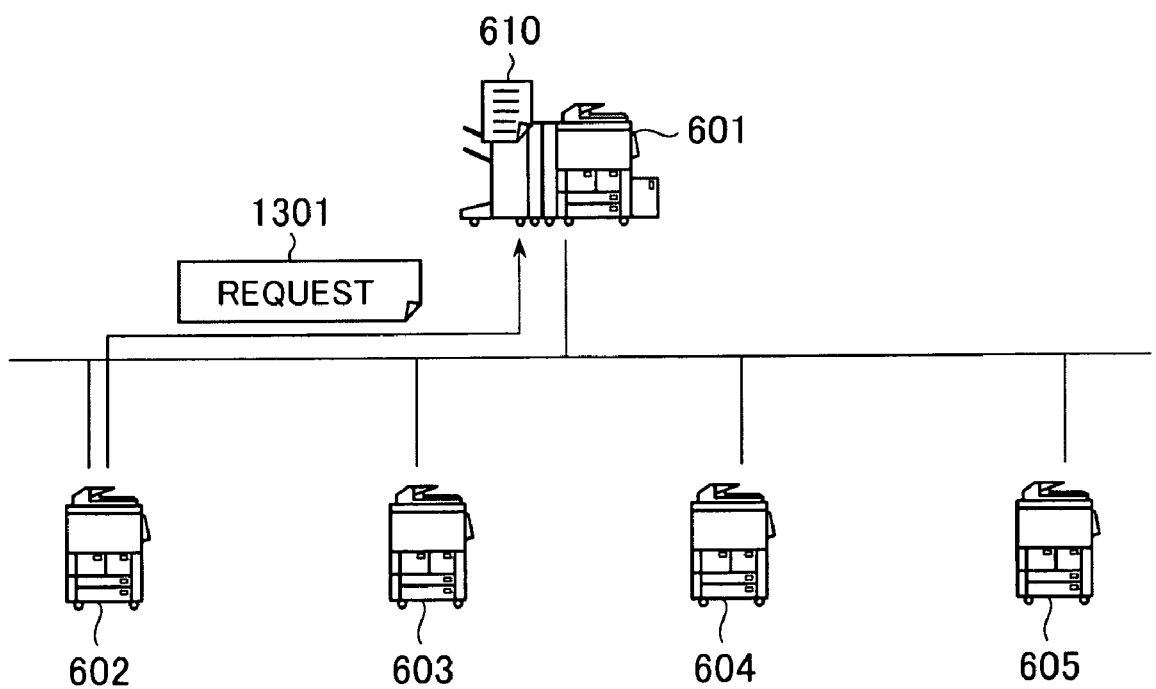
FIG. 9 is a conceptual diagram showing the action of the master unit of determining whether or not an error log should be accepted.

An action of determining whether or not the master unit 601 should accept an error log storage request when the master unit 601 received the error log storage request from the slave units 602 to 605 will be concretely described with reference to FIG. 9. FIG. 9 is a conceptual diagram showing the action of the master unit of determining whether or not an error log should be accepted, wherein like numerals are assigned to the like elements in FIG. 5.

(i) A Case where Master Unit 601 itself is not Performing Processing

First, a case where the master unit 601 itself is not performing processing will be described. In this case, as shown in FIG. 9, when an error log storage request 1301 is sent to the master unit 601 from the slave unit 602, the master unit 601 determines from its own job log 610 whether or not the time is when the concentration of the use of the master unit 601 is expected.

FIG. 10 is a table showing an example of a job log of the master unit itself.

The job log 610 is segmented by the hour into time zones, such as between 8 a.m. and 8:59 a.m. (field 1001 in FIG. 10), between 9 a.m. and 9:59 a.m. (field 1002), between 10 a.m. and 10:59 a.m. (field 1003), between 11 a.m. and 11:59 a.m. (field 1104), between 3 p.m. and 3:59 p.m. (field 1005), between 5 p.m. and 5:59 p.m. (field 1006), and between 7 p.m. and 7:59 p.m. (field 1007).

The master unit 601 determines the operating situation for each of the segmented time zones. The operating situation can be determined based on the number of uses, the total number of processed sheets and so on, as described above. A threshold is provided with respect to the determined operating situations. When the operating situation for a given time zone exceeds the threshold, the time zone is determined to be the time when the concentration of the use is expected.

For example, when operating situations are determined from the number of uses, and a threshold is determined to be three times, in the example of FIG. 10, if the slave unit 602 sent an error log storage request 1301 in the time zones between 8 a.m. and 8:59 a.m. and between 9 a.m. and 9:59 a.m., in principle, the acceptance of the main body of the error log is rejected temporarily, and the storage of it is postponed.

In the present embodiment, the criterion for accepting the main body of an error log is the one-day job log of the master unit 601. However, without being limited thereto, for example, if many job logs 610 of the master unit 601 itself are stored, the operating situations may be determined hourly for each of a plurality of days, without being limited to one day, to calculate an average hourly operating situation, which result may be used as a criterion.

The unit for calculating the operating situation of the master unit 601 is not limited to an hourly unit as shown in FIG. 10. For example, the operating situation of the master unit 601 may be determined in morning and afternoon. Alternatively, the operating situation of the master unit 601 may be determined for each of time zones segmented so as to correspond to working time in the office, such as before 9 a.m., between 9 a.m. and 0 p.m., between 0 p.m. and 1 p.m., between 1 p.m. and 5 p.m., and after 5 p.m. Instead of segmenting in this way with regular timing, it is possible to set time zones for grasping the operating situation dynamically, for example, within one hour of an error log storage request.

As described above, in principle, when the master unit 601 is expected to be used, the storage of the main body of the error log from the slave unit 602 is postponed. However, if an error related to the error log is a fatal error to the slave unit 602, or the log memory 2100 of the slave unit 602 is full (or almost full), the error log has to be stored urgently.

In this case, the following processing (not shown) is performed. For example, an urgent flag is set on the error log storage request 1301. When the urgent flag is on, the master unit 601 determines that the main body of the error log has to be stored. The master unit 601 permits the error log storage request 1301, and requests the slave unit 602 to send the main body of the error log. The main body of the error log sent from the slave unit 602 is received by the master unit 601, and written on the HDD 2004 of the master unit 601.

For example, when paper jams (jamming) frequently occurs at the slave unit 602, the log memory 2100 of the slave unit 602 is filled promptly, therefore, the following processing is performed. For example, when the predetermined number or greater of jams occurs, the slave unit 602 sends the master unit 601 the error log storage request 1301 whose urgent flag is on as described above. This allows the master unit 601 to write the error log on the HDD 2004 before the log memory 2100 of the slave unit 602 becomes full of error logs.

When the main body of the error log is stored in the master unit 601, the slave unit 602 clears the log memory 2100. If logs other than error logs that have been sent are stored in the log memory 2100, only the error logs sent are removed.

Although the slave unit 602 first sends the error log storage request 1301 to the master unit 601 in the above description, the slave unit 602 may send the main body of the error log to the master unit 601 directly. When the concentration of the use of the master unit 601 is expected in a state where the master unit 601 is not performing the function, if there is an error log storage request whose urgent flag is off, the error log storage request from the slave unit may be accepted as follows. Based on the priorities of slave units, an error log storage request from a slave unit having a priority equal to or greater than a given threshold may be accepted.

(ii) A Case where Master Unit 601 is Performing Function

Next, a case where the master unit 601 is performing the function will be concretely described. In this case, the priorities of the slave units 602 to 605 obtained from the priority table described above are corrected based on the condition of the master unit 601, and if the corrected priorities reach a predetermined threshold or greater, their error logs are stored in the master unit 601.

The description will be provided with reference to the priority table in FIG. 11 and the threshold and various correction values in FIG. 12. FIG. 11 is a diagram showing an example of a priority table. FIGS. 12A and 12B are diagrams showing an example of a propriety threshold and various correction values.

The device name A shown at line 1101 in FIG. 11 represents the slave unit 602 in FIG. 5. Similarly, the device name B at line 1102 represents the slave unit 603, the device name C at line 1103 represents the slave unit 604, and the device name D at line 1104 represents the slave unit 605, respectively.

In FIG. 12A, a threshold $\theta$ is a boundary value such that when the corrected priority is equal to or greater than this value, error log storage is accepted. A correction value for retransmission $\pi$ will be described later. A panel operation correction value $\rho$ is a value by which a priority is corrected when the operation panel (operating unit 2012) of the master unit 601 is being used. That is to say, since the fact that the operation panel is being used means that the master unit 601 is being used by a predetermined user, the priority is corrected so that a higher priority is given on the processing of the master unit 601.

A per-job-type correction table shown in FIG. 12B is used by the master unit 601 to correct priorities based on the types of jobs in processing on the master unit 601. For example, since color data is larger than black-and-white data, when color data is processed, a large load is placed on the CPU 2001 of the master unit 601. Therefore, the per-job-type correction table is used to change the priorities based on the types of jobs.

The per-job-type correction table is comprised of a field 1205 for representing the types of jobs and a field 1206 for representing their correction values. In the example of FIG. 12B, the correction value for a color job (Color) is "−15", the correction value for a black-and-white job (BW) is "−5", the correction value for a FAX job (FAX) is "−20", and the correction value for a printing job (Print) is "−10". Further, the correction value for a Nin1 job (Nin1) in which a plurality of pages are printed out on one sheet of paper is "−5".

It should be noted that since the per-job-type correction table shown in FIG. 12B is only an example, the types of jobs are not limited thereto, and not all of them may be contained.

The correction value for the job type X is hereinafter referred to as "JCT (X)". For example, it can be seen that the "JCT (FAX)" is "−20" from the per-job-type correction table. The X portion in "JCT (X)" may include several entries without being limited to one entry. The sum of the correction values is used in such a case. For example, "JCT (Color, Nin1)" is "−20", that is the sum of the correction value of Color "−15" and the correction value of Nin1 "−5".

The priority of a slave unit is represented as "$\alpha$", and the corrected priority is represented as "$\alpha'$". When the corrected priority "$\alpha'$" is equal to or greater than the threshold $\Theta$, the master unit 601 performs error log storage. The description will now be provided by giving a concrete example.

When the slave unit 602 (device name A in FIG. 11) sends an error log storage request to the master unit 601, the master unit 601 obtains the priority $\alpha_{602}$ (=100) of the slave unit 602 from the priority table.

In the case where the operating panel of the master unit 601 is being used to make a color copy at this moment, since the panel operation correction value $\rho$ is "−20" and JCT(Color) is "−15", the following is determined:

$$\alpha'_{602} = \alpha_{602} + \rho + JCT(\text{Color}) = 100 - 20 - 15 = 65 < \theta$$

The priority $\alpha'_{602}$ is 65, which is less than the threshold $\theta$ (=70), thus, the master unit 601 does not store the error log from the slave unit 602.

As described above, an urgent error log is stored in the master unit 601 by priority. This will not be described explicitly below, but is the same as the earlier explanation. On the other hand, in the case where the operating panel of the master unit 601 is being operated to make a black-and-white copy, since JCT(BW) is "−5", the following is determined:

$$\alpha'_{602}=\alpha_{602}+\rho+JCT(BW)=100-20-5=75>\theta$$

The priority $\alpha'_{602}$ is 75, which exceeds the threshold $\theta$ (=70), thus the error log is stored in the master unit 601.

In the case where the operating panel of the master unit 601 is not being used, and facsimile transmission is being made from the PC 140, since JCT(FAX) is "−20", the following is determined:

$$\alpha'_{602}=\alpha_{602}+JCT(FAX)=100-20=80>\theta$$

As a result, the master unit 601 accepts the error log storage request.

On the other hand, in the case where facsimile transmission is made from the operating panel $$\alpha'_{602}=\alpha_{602}+\rho+JCT(FAX)=100-20-20=60<\theta$$

of the master unit 601, the panel operation correction value $\rho$ is added, thus, the following is determined: As a result, the master unit 601 does not accept the error log storage request.

In addition, for example, the priority of the slave unit 605 (device name D in FIG. 11) is 80. Since the panel operation correction value $\rho$ is "−20", when the panel operation of the master unit 601 is being performed, this is sufficient to bring the priority level to 60. As a result, the error log storage request is not accepted.

On the other hand, in the case where a print job is sent from the PC 140 to the master unit 601, and the master unit 601 is just handling it, since JCT(Print) is ="−10", the following is determined:

$$\alpha'_{605}=\alpha_{605}+JCT(Print)=80-10=70\geq\theta$$

Since the priority $\alpha'_{605}$ is equal to the threshold $\theta$, the master unit 601 accepts the error log storage request.

The action of the master unit 601 taken when an initial error log storage request was made from each of the slave units 602 to 605 has been described. A case where the error log storage request is retransmitted will be described later.

As described above, since the priorities of the slave units 602 to 605 are different, even if the master unit 601 is under the same condition, whether or not the error log storage request is to be accepted changes dynamically. Further, even if the error log storage request is from the same slave unit, whether or not the error log storage request is to be accepted changes dynamically, depending on the condition of the master unit 601.

(iii) A Case where Error Log Storage Request was not Accepted

Next, a case where the master unit 601 did not accept the error log storage request from the slave units 602 to 605 will be described.

As described with reference to FIG. 10, the master unit 601 can calculate the time when the concentration of the use is expected based on its own job log 610. The master unit 601 instructs a slave unit whose error log storage is postponed because the error log storage request is not accepted at this moment to retransmit the error log storage request at a time when the concentration of the use of the master unit 601 is not expected.

At the specified time, the slave unit receiving the instruction to retransmit sets a retransmission flag indicating retransmission on the error log storage request, and retransmits the error log storage request to the master unit 601, which is not shown.

The master unit 601 receives the error log storage request, checks that the retransmission flag is on, and corrects its priority. In this case, the correction value for retransmission $\pi$ in FIG. 12A is added as a correction value. For example, in the example described above, in the case where the operating panel of the master unit 601 is being used to make a color copy, the priority was "65" after correction for the initial error log storage request. When the master unit 601 under the same condition as above receives the retransmitted error log storage request, the correction value for retransmission $\pi$ is "145", thus, the following is determined:

$$\alpha'_{602}=\alpha_{602}+\pi+\rho+JCT(Color)=100+145-20-15=210>\theta$$

As a result, the master unit 601 accepts the retransmitted error log storage request.

In the example in FIG. 12A, the reason for setting the correction value for retransmission $\pi$ to 145 is so that the master unit 601 accepts the retransmitted error log storage request in any case. That is to say, assuming that the uncorrected priority $\alpha$ is zero or greater, the corrected priority $\alpha'$ is:

$$\alpha' = \alpha + \pi + \rho + JCT(\text{Color}, BW, FAX, \text{Print}, Nin1) > \pi +$$
$$\rho + JCT(\text{Color}, BW, FAX, \text{Print}, Nin1)$$
$$= \pi - 20 + (-15 - 5 - 20 - 10 - 5)$$
$$= \pi - 75 \geq \theta$$
$$= 70$$

$$\pi \geq 70 + 75 = 145$$

Thus, if the correction value for retransmission $\pi$ is 145 or greater, the corrected priority $\alpha'$ always exceeds the threshold $\theta$ (=70).

In this example, the retransmitted error log storage request was accepted, but without being limited thereto. An error log storage request having a corrected priority less than a given value may not be accepted even if it is retransmitted. Alternatively, instead of the correction value for retransmission $\pi$ being a fixed value, the value may be changed depending on the number of retransmissions.

By way of example, the correction value for retransmission $\pi$ is defined as follows:

$$\pi=15\times n$$

where n is the number of retransmissions.

It is assumed that the error log storage request is sent from the slave unit 604 (device name C in FIG. 11) to the master unit 601, and the storage request is retransmitted for the first time. It is assumed that in the master unit 601, the facsimile transmission is being made from the PC 140 at this moment. Since the priority $\alpha_{604}$ of the slave unit 604 is 65, the following is determined:

$$\alpha'_{604}=\alpha_{604}+\pi+JCT(Print)=65+(15\times1)-20=60<\theta$$

As a result, the error log storage request retransmitted for the first time is not accepted by the master unit 601, and the master unit 601 requests the slave unit 604 to retransmit the error log storage request. Assuming that the operating panel of the master unit 601 is being operated to make a black-andwhite copy when the slave unit 604 sends (retransmits) the request for a second time, the following is determined:

$$\alpha'_{604}=\alpha_{604}+\pi+\rho+JCT(BW)=65+(15\times2)-20-5=70=\theta$$

As a result, the second error log storage request from the slave unit 604 is accepted by the master unit 601, and the master unit 601 stores the error log of the slave unit 604.

In the example, when the error log storage request is retransmitted for a second time, the operating panel of the master unit 601 is being used. Since the correction value π excluding the correction value for retransmission is "−25", compared to "−20" of the first retransmission, the error log storage request is less prone to being accepted by the master unit 601. Nevertheless, even though the error log storage request from the slave unit whose original priority is less than the threshold, the master unit 601 can accept the error log storage request as the number of retransmissions increases. It should be noted that, in this case, not only a retransmission flag indicating retransmission is set on the error log storage request, but a value indicating the number of retransmissions is also placed in the error log storage request.

In the present embodiment, it has been described that the master unit 601 makes reference to its own job log 610 and instructs the slave units 602 to 605 to retransmit the error log storage request at a time when the concentration of the use is not expected. Without being limited thereto, the master unit 601 may give an instruction without specifying such a time to retransmit the error log storage request after a predetermined time has elapsed. Alternatively, the slave units 602 to 605 may retransmit the error log storage request after a predetermined time has elapsed without specifying the time by the master unit 601. Further, without using the correction value for retransmission π (π=0), the master unit 601 may determine a corrected priority only based on the priorities of the slave units 602 to 605 and the condition of the master unit 601 at the time of receiving the error log storage request, and then determine whether or not the error log storage request should be accepted.

(II) Flow of Process of Determining whether or not Error Log should be Accepted

Figure 13:
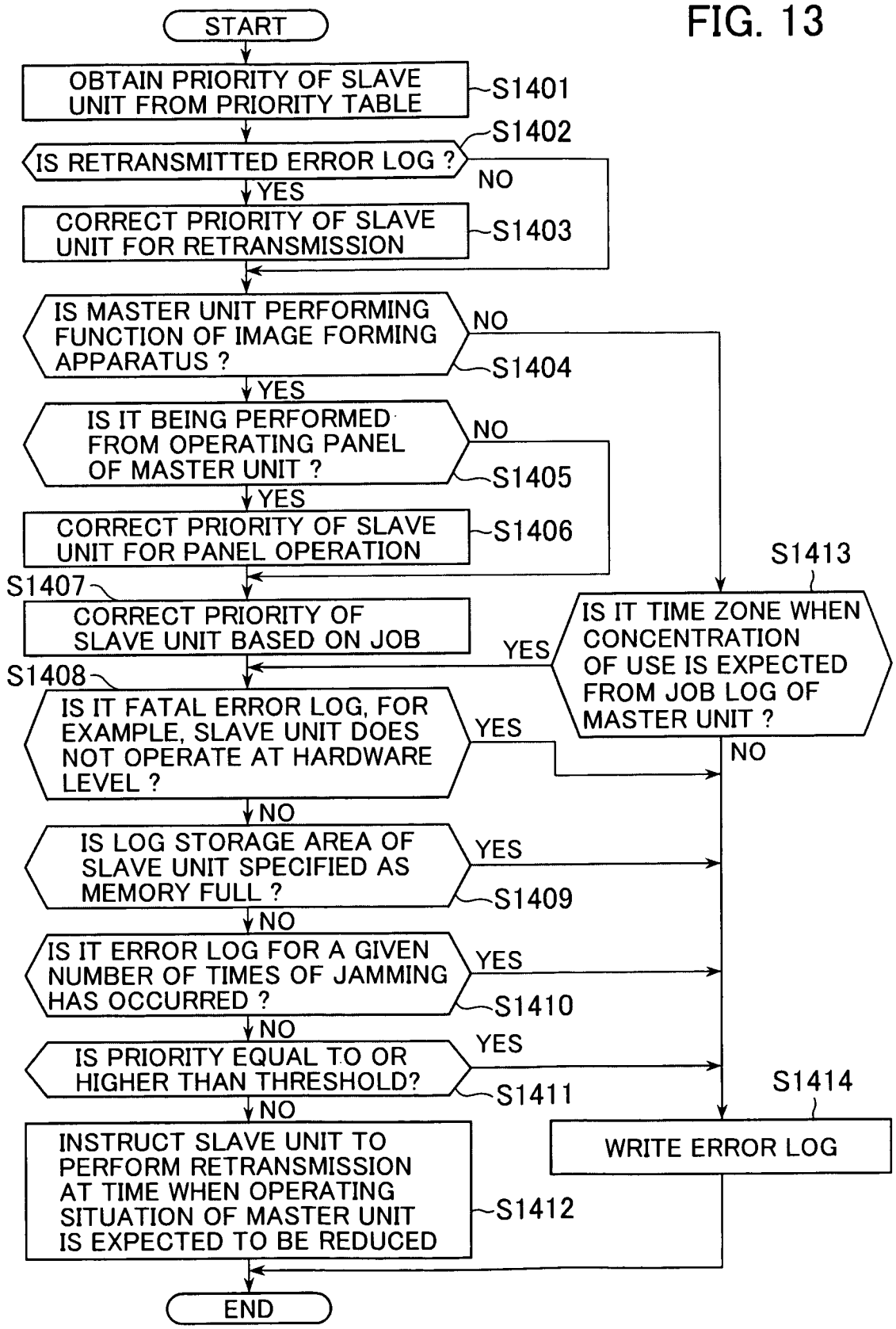
FIG. 13 is a flowchart showing the flow of a process of determining whether or not an error log should be accepted according to a first embodiment.

Next, the flow of a process in which the master unit 601 determines whether or not the error log storage request from the slave units 602 to 605 should be accepted will be described with reference to FIG. 13. FIG. 13 is a flowchart showing the flow of a process of determining whether or not an error log should be accepted according to the first embodiment. Each step in FIG. 13 is performed by running a program expanded into the RAM 2002 from the ROM 2003 by the CPU 2001 of the master unit 601.

First, in step S1401, the CPU 2001 obtains the priority of a slave unit that sent an error log storage request from the priority table. Next, in step S1402, the CPU 2001 checks the error log storage request. When a flag indicating that this is a retransmitted error log is on in step S1402 (S1402=YES), the process goes to step S1403, otherwise (S1402=NO) the process go to step S1404.

In step S1403, since the error log storage request from the slave unit is the retransmitted error log storage request, the CPU 2001 uses the correction value for retransmission to correct the priority obtained in step S1401. Then, the process goes to step S1404.

In step S1404, the CPU 2001 determines whether or not the master unit 601 itself is performing the function of the image forming apparatus. When the master unit 601 is performing the function of the image forming apparatus (S1404=YES), the process goes to step S1405. On the other hand when the master unit 601 is not performing the function of the image forming apparatus (S1404=NO), the process goes to step S1413. In step S1405, the CPU 2001 determines whether or not the function is being performed from the operating panel of the master unit 601 itself. When the function is being performed from the operating panel (S1405=YES), the process goes to step S1406.

In step S1406, the CPU 2001 corrects the priority of the slave unit based on the fact that the operating panel of the master unit 601 is being operated. After that, the process goes to step S1407. When the function is not being performed from the operating panel in step S1405 (S1405=NO), the process goes to step S1407. This is the case where a job has been submitted from the PC 140 and so on, for example. In step S1407, the CPU 2001 corrects the priority of the slave unit depending on the type of the job which the master unit 601 is performing as the image forming apparatus.

On the other hand, step S1413 is performed when the master unit 601 is not performing the function of the image forming apparatus in step S1404. In step S1413, the CPU 2001 checks the job log of the master unit 601 itself, and then determines whether or not the current time is the time when the concentration of the use of the master unit 601 is expected. When the concentration of the use is expected (S1413=YES), the process goes to step S1408, on the other hand when the concentration of the use is not expected (S1413=NO), the process goes to step S1414. In step S1414, the error log is stored in the master unit 601, and the process is finished.

In step S1408, the CPU 2001 determines whether or not the error log storage request is related to a fatal error, such as the slave unit does not operate at the hardware level. A predetermined flag is prepared on the error log storage request, so that the determination can be made based on the flag. When the error log notifies a fatal error (S1408=YES), the process goes to step S1414, otherwise (S1408=NO) the process goes to step S1409.

In step S1409, the CPU 2001 determines whether or not the log memory 2100 of the slave unit becomes full. Also, a flag is prepared on the error log storage request, so that the determination can be made based on the flag. When the memory is full (S1409=YES), the process goes to step S1414, otherwise (S1409=NO) the process goes to step S1410.

In step S1410, the CPU 2001 determines whether or not the error log storage request is related to an error log after a given number of times of jamming has occurred. Also, a flag is prepared during the error log storage request, so that the determination can be made based on the flag. When it is an error log after a given number of times of jamming has occurred (S1410=YES), the process goes to step S1414, otherwise (S1410=NO) the process goes to step S1411.

In step S1411, the CPU 2001 determines whether or not the corrected priority is equal to or higher than a predetermined threshold. When the corrected priority is equal to or higher than the threshold (S1411=YES), the process goes to step S1414, otherwise (S1411=NO) the process goes to step S1412.

In step S1412, the CPU 2001 uses the job log of the master unit 601 to check the operating situation of itself. Then, the CPU 2001 instructs the slave unit to retransmit the error log storage request at a time when the operating situation of the master unit 601 is expected not to be busy. Then, the process is finished. In step S1414, the CPU 2001 stores (writes) the error log of the slave unit on the HDD 2004 of the master unit 601. Then, the process is finished.

While the processing of the error log has been described as above, it should be noted that the same processing may be performed also on a log which occurs accidentally and has a large size, even if the log would degrade the processing performance of the master unit 601.

<Advantages of the Present Embodiment>

The first embodiment has the following advantages.

The master unit 601 obtains usual job logs regularly from the slave units 602 to 605. The master unit 601 checks the operating situations of the slave units 602 to 605 from the job logs, and calculates their utilization rates which form the basis for calculating the priority described above. Since a slave unit having a higher utilization rate is frequently used, the master unit 601 determines that the log memory 2100 of such a slave unit tends to become full, and accepts the error log storage request from such a slave unit by priority.

On the other hand, the master unit 601 determines that the log memory 2100 of a slave unit having a lower utilization rate does not tend to become full, and degrades the priority with respect to acceptance of the error log storage request. In this manner, even if there are many slave units to be managed, the error log from the slave unit having the higher utilization rate is accepted by priority, and a restriction is imposed on the acceptance of the error log from the slave unit having the lower utilization rate. This allows the error logs from the slave units 602 to 605 to be accepted efficiently without degrading the performance of the master unit 601 serving as the image forming apparatus. In this case, the priorities are determined based on not only the utilization rates of the slave units 602 to 605, but also the utilization rate and the operating condition of the master unit 601 itself (e.g., whether a user actually operates the master unit 601). This allows dynamic priorities to be set to the slave units 602 to 605 automatically.

In the present embodiment, by using successively changing job logs, based on the priorities of the slave units 602 to 605 and the successively changing operating condition of the master unit 601, whether or not the error log storage request from the slave units 602 to 605 should be accepted can be determined dynamically.

Further, through the calculation of the operating situation of the master unit 601 obtained based on the job log 610 of the master unit 601 itself, it becomes possible to determine whether or not the error log from the slave units 602 to 605 should be stored and determine retransmission time from the slave unit whose error log storage request was rejected.

Moreover, based on the type of job that is being performed at the master unit 601 and information on whether or not the job is being performed by the operating panel, the priorities of the slave units 602 to 605 can be corrected dynamically. Using an error log storage request, it becomes possible to achieve a mechanism that an urgent error log can be stored in the master unit 601 by priority.

[Second Embodiment]

In the first embodiment, when the storage of an error log is postponed, the master unit 601 instructs the slave units 602 to 605 to retransmit their error log storage request. In contrast, in the second embodiment, when the storage of an error logs is postponed, the master unit 601 obtains the error log from the slave unit 602 to 605 when it is convenient for the master unit 601. The second embodiment will now be described.

<Action taken when Storage of Error Log was Postponed>

Figures 14, 15, 16:
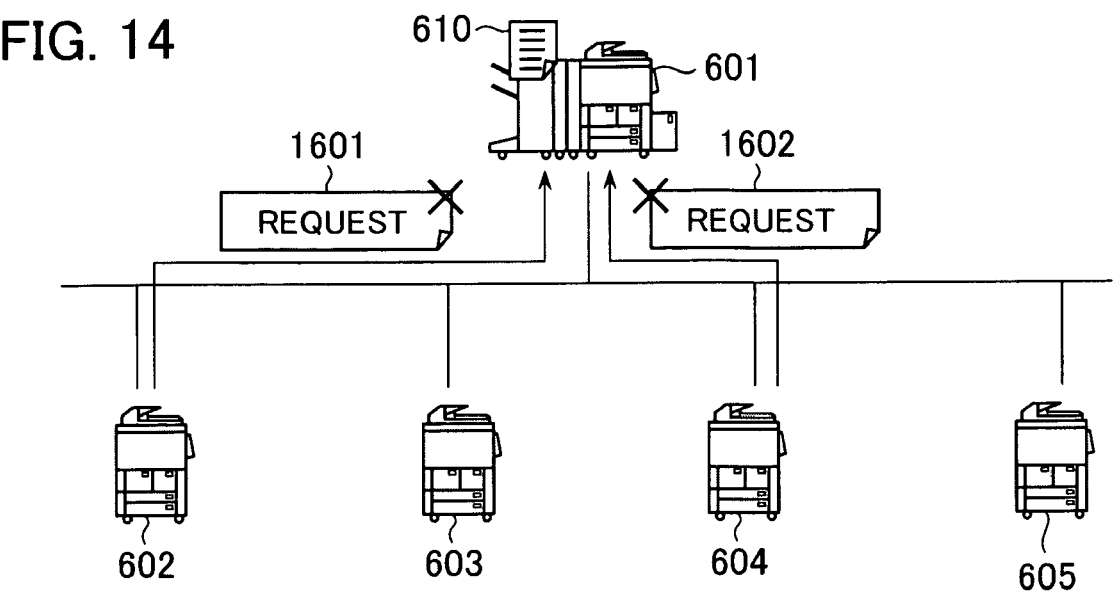
FIG. 14 is a conceptual diagram showing an action taken when storing of an error log was postponed.
FIG. 15 is a diagram showing an example of an error log storage waiting list.
FIG. 16 is a diagram showing another example of the error log storage waiting list.

An action taken when the master unit 601 postponed an error log storage request will be described with reference to FIG. 14. FIG. 14 is a conceptual diagram showing an action taken when the storage of an error log was postponed, wherein like numerals are assigned to the like elements in FIG. 5.

It is assumed that although the slave unit 604 sent an error log storage request 1602, the master unit 601 rejected the error log storage request 1602. At this moment, the master unit 601 adds the slave unit 604 to an error log storage waiting list (hereinafter referred to as "storage waiting list"). The storage waiting list will be described in details later. Similarly, it is assumed that although the slave unit 602 sent an error log storage request 1601, the master unit 601 rejected the error log storage request 1601. Therefore, the master unit 601 adds the slave unit 602 to the storage waiting list. The way of determining whether or not the error log storage request should be accepted is the same as that described in the first embodiment.

For example, the storage waiting list looks like one shown in FIG. 15. FIG. 15 is a diagram showing an example of the storage waiting list.

In FIG. 15, a field 1701 represents the name of a device for identifying a slave unit that made an error log storage request, and fields 1702 and 1703 represent the date and time, respectively, when an error log storage request was sent. As in FIG. 11, the device name A represents the slave unit 602 in FIG. 14, and the device name C represents the slave unit 604.

At line 1704 in FIG. 15, it is indicated that the error log storage request sent by the slave unit 604 on "Oct. 5, 2007" at "11:24.54" was rejected by the master unit 601. At line 1705 in FIG. 1705, it is indicated that the error log storage request sent by the slave unit 602 on "Oct. 5, 2007" at "13:10.00" was rejected by the master unit 601.

The master unit 601 performs the following process in the case where the master unit 601 itself is not performing the function of the image forming apparatus, or in the case where the concentration of the use of the function is not expected from its own job log 610. That is to say, the master unit 601 checks the storage waiting list, and obtains the error log from a slave unit which sent an error log storage request but whose error log has not be stored yet. In the example of FIG. 15, the error logs of the slave units 604 and 602 are waiting to be stored. Then, the master unit 601 makes reference to the priority table, and obtains the error log from the slave unit having a higher priority.

Assuming that the priority table shown in FIG. 7 is used here, the priority of the slave unit 604 is "65", and that of the slave unit 602 is "100". Consequently, the error log of the slave unit 602 which has sent the error log storage request temporally after the slave unit 604 is stored in the master unit 601 first. In contrast, the error logs may be stored simply in order of occurrence of the error log storage requests.

When an error log storage request has been made several times, it is assumed that a storage waiting list such as shown in FIG. 16 exists. Items of the storage waiting list shown in FIG. 16 are the same as those of the storage waiting list shown in FIG. 15. According to the priority table shown in FIG. 7, the priority of the slave unit 605 (device name D) is "80" and that of the slave unit 603 (device name B) is "35". Therefore, the master unit 601 first stores the error log of the slave unit 605. Alternatively, since the number of error log storage requests from the slave unit 603 is greater, the master unit 601 may first store the error log of the slave unit 603.

Alternatively, when there is a slave unit whose error log storage request has been rejected more than a given number of times in the storage waiting list, the master unit 601 may obtain the error log of the slave unit by priority.

<Flow of Process of Determining which Error Log should be Stored>

Next, the flow of a process in which the master unit 601 determines from which slave unit in the storage waiting list the error log should be stored will be described with reference to FIGS. 17 and 18.

Figure 17:
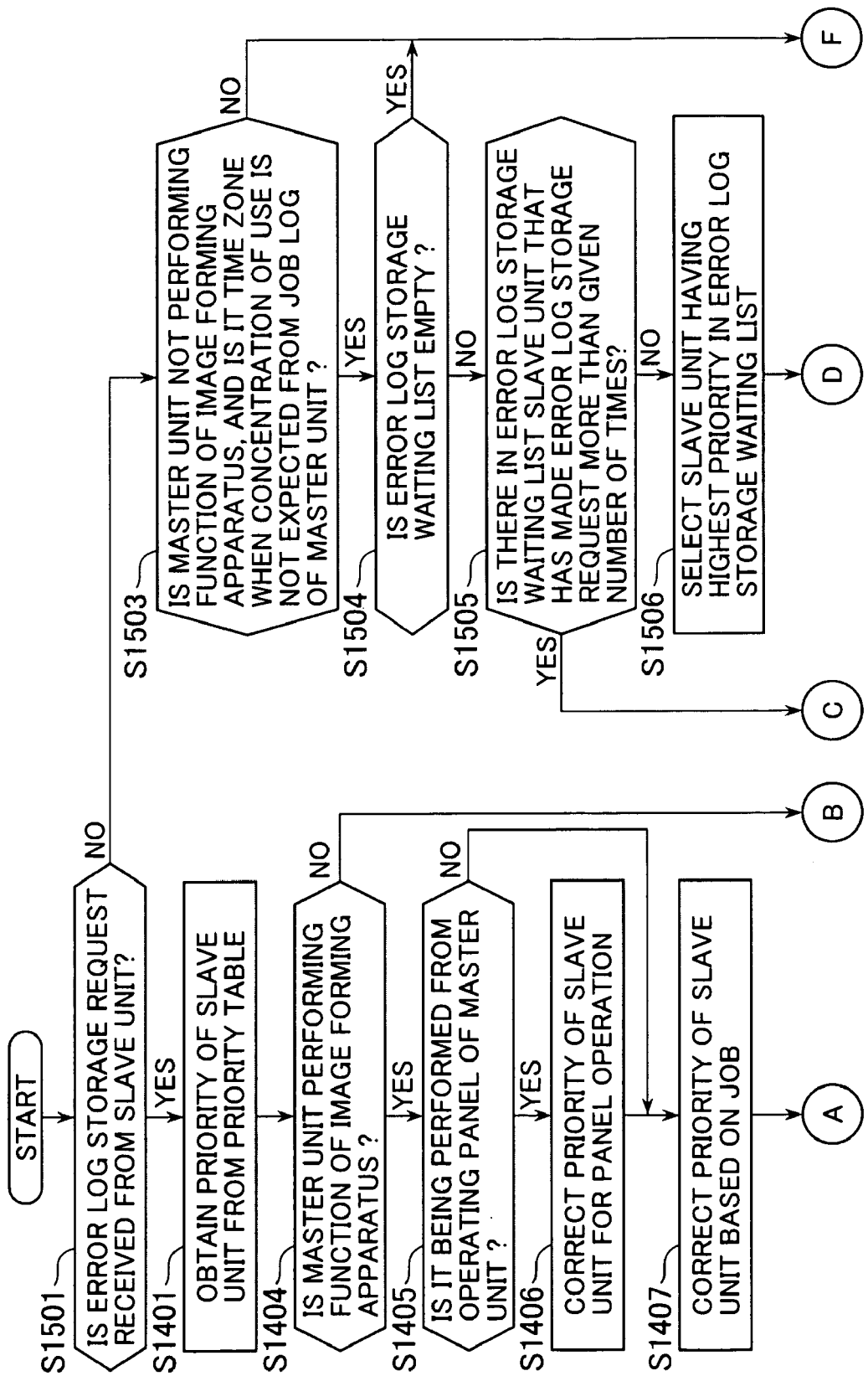
FIG. 17 is a flowchart showing the flow of a process of determining which error log should be stored according to a second embodiment.
Figure 18:
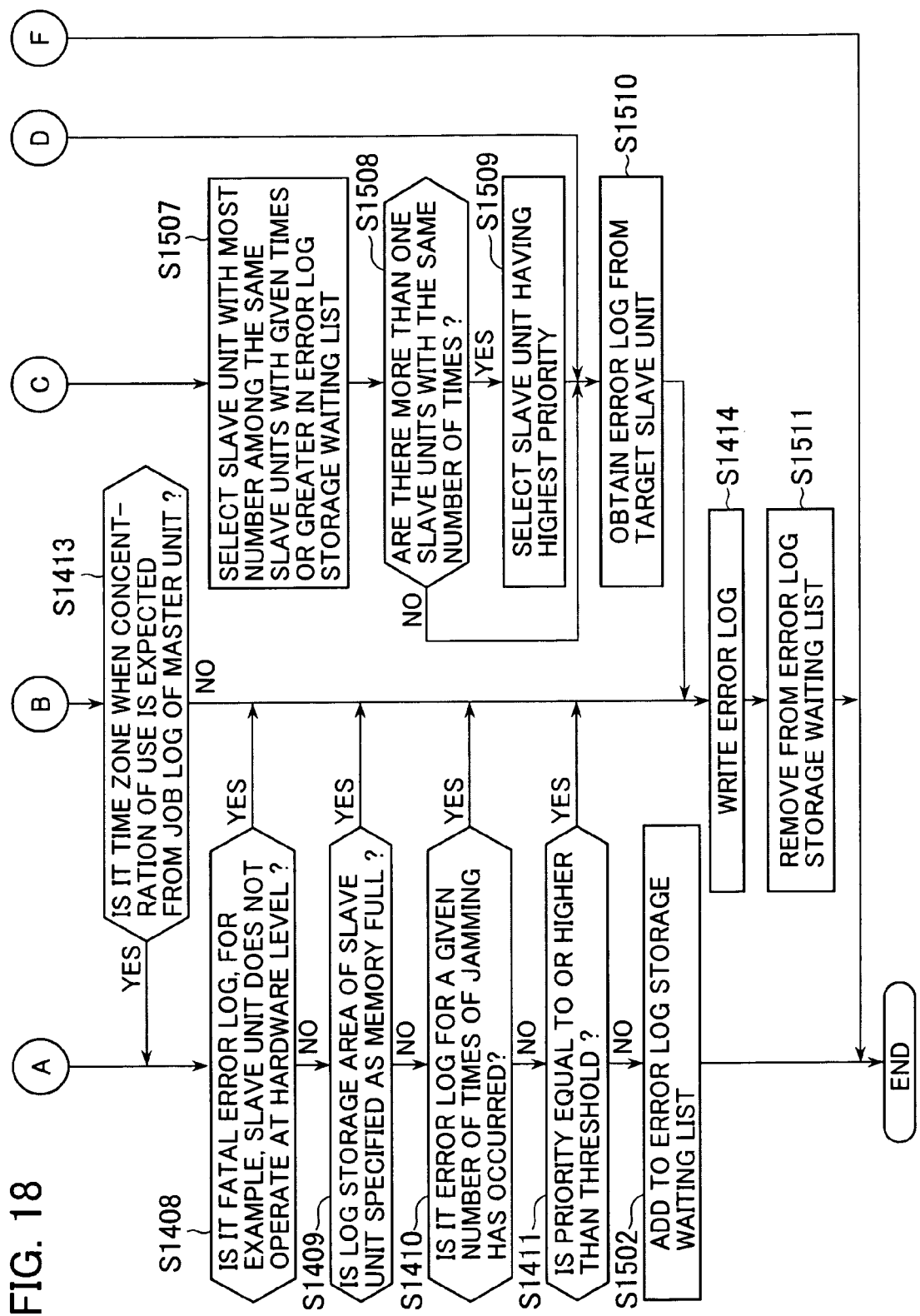
FIG. 18 is a flowchart continued from FIG. 17.

FIGS. 17 and 18 are flowcharts showing the flow of a process of determining which error log should be stored according to the second embodiment. Among the processes shown in FIGS. 17 and 18, like numerals are assigned to the like processes in FIG. 13 and the description about them will be omitted. Each step in FIGS. 17 and 18 is performed by running a program expanded into the RAM 2002 from the ROM 2003 by the CPU 2001 of the master unit 601.

First, in step S1501, the CPU 2001 determines whether or not an error log storage request from a slave unit was received. When the master unit 601 received the error log storage request (S1501=YES), the process goes to step S1401, and the processing described in connection to the flowchart in FIG. 13 is performed. In the flowchart in FIG. 13, when the storage of an error log is postponed, the process goes to step S1412 where a request to retransmit the error log storage request is made to the slave unit. In contrast, in the present flowchart, the process goes to step S1502 in stead of step S1412. In step S1502, the CPU 2001 adds information on the slave unit which made the error log storage request to the storage waiting list, and the process is temporarily finished. It should be noted that the process practically returns to step S1501, and the process is performed on the slave unit added to the storage waiting list.

In step S1501, when the master unit 601 received no error log storage request (S1501=NO), the process goes to step S1503. In step S1503, the CPU 2001 determines whether or not the master unit 601 itself is not performing the function of the image forming apparatus, and whether or not the time zone is when the concentration of the use is not expected from its own job log 610. If the master unit 601 is performing the function of the image forming apparatus, or the time zone is when the concentration of the use is expected (S1503=NO), the process is finished. If the master unit 601 is not performing a predetermined function, and the concentration of the use is not expected (S1503=YES), the process goes to step S1504.

In step S1504, the CPU 2001 checks the storage waiting list. When the storage waiting list is empty (S1504=YES), the process is finished, on the other hand the list is not empty (S1504=NO), the process goes to step S1505. In step S1505, the CPU 2001 determines whether or not the slave unit whose error log storage has been postponed more than a predetermined number of times is in the storage waiting list, that is to say, whether there is a slave unit that has made an error log storage request more than a given number of times. When there is such a slave unit (S1505=YES), the process goes to step S1507, on the other hand when there is no such a slave unit (S1505=NO), the process goes to step S1506.

In step S1506, the CPU 2001 selects the slave unit having the highest priority in the storage waiting list, and the process goes to step S1510. When there are a plurality of slave units having the same priority, one of them is selected. The slave unit found first may be selected, for example. Alternatively, the slave unit that has made an error log storage request first may be selected among the relevant slave units. Alternatively, the slave unit with the most number of error log storage postponements may be selected, or a method other than those described herein may be used as long as it is a method for selecting one slave unit.

In step S1507, the CPU 2001 selects the slave unit with the most number of error log storage postponements from the storage waiting list. In the next step S1508, the CPU 2001 determines whether or not more than one slave units were selected in step S1507. When only one slave unit was selected (S1507=NO), the process goes to step S1510, on the other hand when more than one slave units were selected (S1507=YES), the process goes to step S1509.

In step S1509, the CPU 2001 selects the slave unit having the highest priority among the plurality of slave units selected in step S1507. At this moment, when there are a plurality of slave units having the same priority, one of them is selected in the same method described in connection with step S1506. In the next step S1510, the CPU 2001 obtains the error log of the slave unit selected in step S1509, and then the process goes to step S1414.

In step S1414, the CPU 2001 writes the error log obtained in step S1510 on the HDD 2004. Then, the process goes to S1511. In step S1511, the CPU 2001 removes the item of the slave unit related to the processing of the step S1414 from the storage waiting list, and finishes the process. It should be noted that when the determination in step S1501 is "YES" and the process goes to step S1414, an error log is to be stored not of the slave unit in the storage waiting list but of the slave unit which made directly an error log storage request. At this moment, when the slave unit is not in the storage waiting list, any processing is not performed in step S1511.

<Advantage of Second Embodiment>

In the second embodiment, after the storage of an error log is postponed, the master unit 601 can store the error log of the slave unit 602 to 605 when it is convenient for the master unit 601. That is to say, while the processing of the master unit 601 itself is not being performed, the master unit 601 can obtain the error log of the slave unit whose error log storage request was rejected numerous times, or the error log of the slave unit having the higher priority. Thus, efficient error log storage can be performed.

[Third Embodiment]

A third embodiment is similar to the second embodiment on the point that when an error log storage has been postponed, the master unit 601 stores the error log of the slave unit when it is convenient for the master unit 601; however, the method for storing is different from that of the second embodiment.

In the third embodiment, when the master unit 601 itself is not performing the function of the image forming apparatus and also it is not the time zone when the concentration of the use is expected from the job log 610 of the master unit 601 itself, the priorities of the slave units in the storage waiting list are corrected. Then, the master unit 601 obtains the error log of the slave unit having the highest corrected priority.

<Priority Correction Method>

A method of correcting priorities will now be described.

For example, the correction value "γ" related to the number "n" of error log storage requests is determined:

$$\gamma = 15 \times n$$

According to FIG. 16, the correction value of the slave unit 603 is "γ=15×3=45", and the correction value is added to the priority "35", thus the corrected priority becomes "80". On the other hand, the correction value of the slave unit 605 is "γ=15×1=15", and the correction value is added to the priority "80", thus the corrected priority becomes "95". The slave unit 605 has few number of error log storage requests, but the higher corrected priority, therefore, the master unit 601 stores the error log of the slave unit 605.

Another correction method may be used by which the priority is changed depending on a wait time. For example, "time" which is time elapsed in minutes from an error log storage request to the current time is obtained, and the following formula is used to determine the correction value $\epsilon$:

$$\epsilon = time \times 0.5$$

For example, assuming that the current time is just 14 o'clock, in the storage waiting list in FIG. 15, the wait time of the slave unit 604 is 156 minutes, and that of the slave unit 602 is 50 minutes. It should be noted that the seconds are dropped. Then, the correction value $\epsilon_{604}$ of the slave unit 604 becomes "$\epsilon_{604}=156\times0.5=78$", and the correction value $\epsilon_{602}$ of the slave unit 602 becomes "$\epsilon_{602}=50\times0.5=25$". Since the priorities before correction of the slave units 604 and 602 are "65" and "100", the priorities after correction become "143" and "125", respectively. As a result, the master unit 601 stores the error log of the slave unit 604.

It should be noted that when there are more than one error log store requests from the same slave unit in the storage waiting list, the request that has been waiting for the longest time may be selected, and the error log thereof stored.

Although several methods of correcting priorities have been described, these methods may be combined to correct priorities. Further, when error log storage requests were made from a particular slave unit more than a given number of times within a given period of time, the priority of the slave unit may be increased.

<Flow of Process of Determining which Error Log should be Stored>

Next, the flow of a process in which the master unit 601 uses the corrected priorities to determine from which slave unit in the storage waiting list the error log should be stored will be described with reference to FIGS. 19 and 20.

Figure 19:
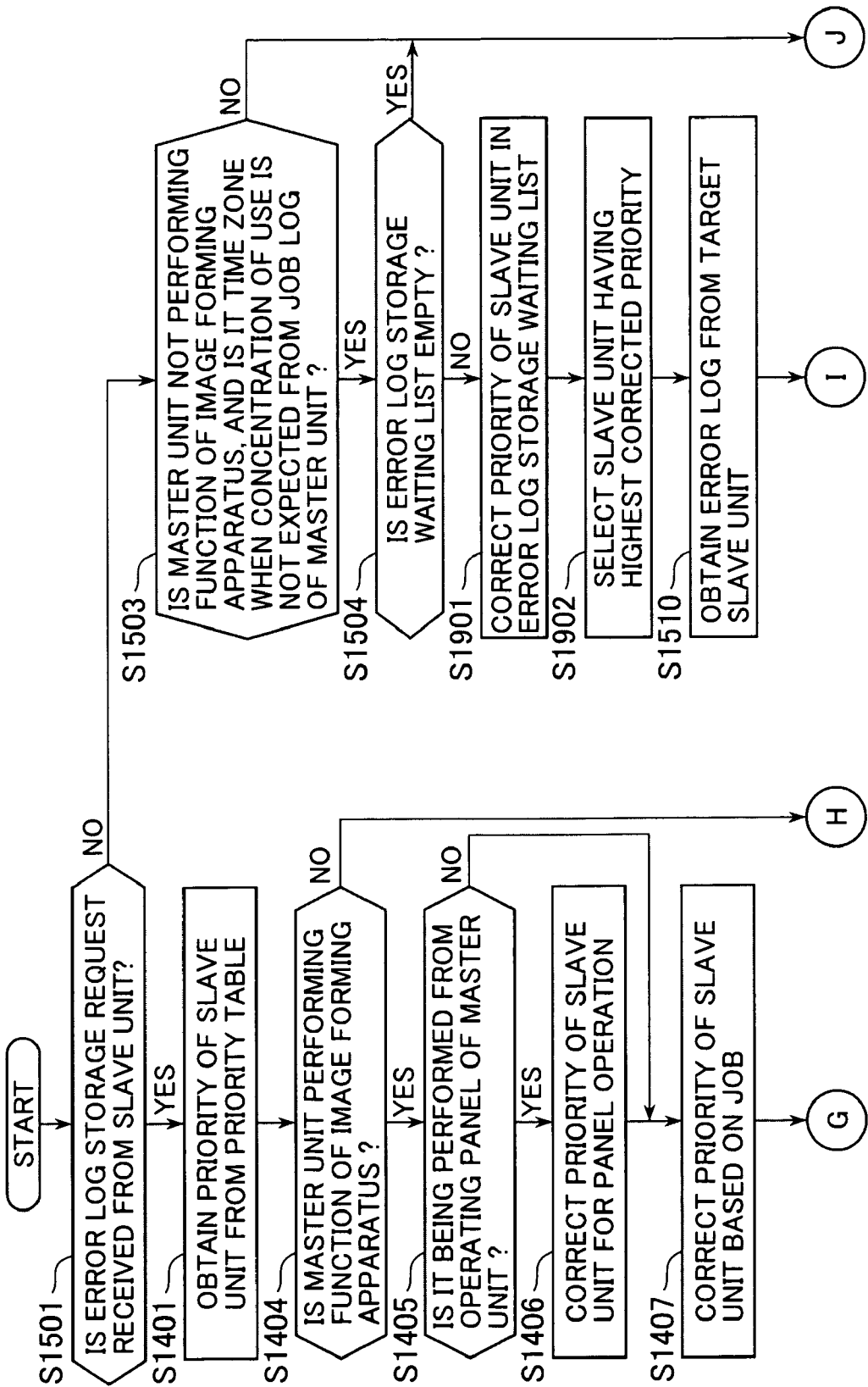
FIG. 19 is a flowchart showing the flow of a process of determining which error log should be stored according to a third embodiment.
Figure 20:
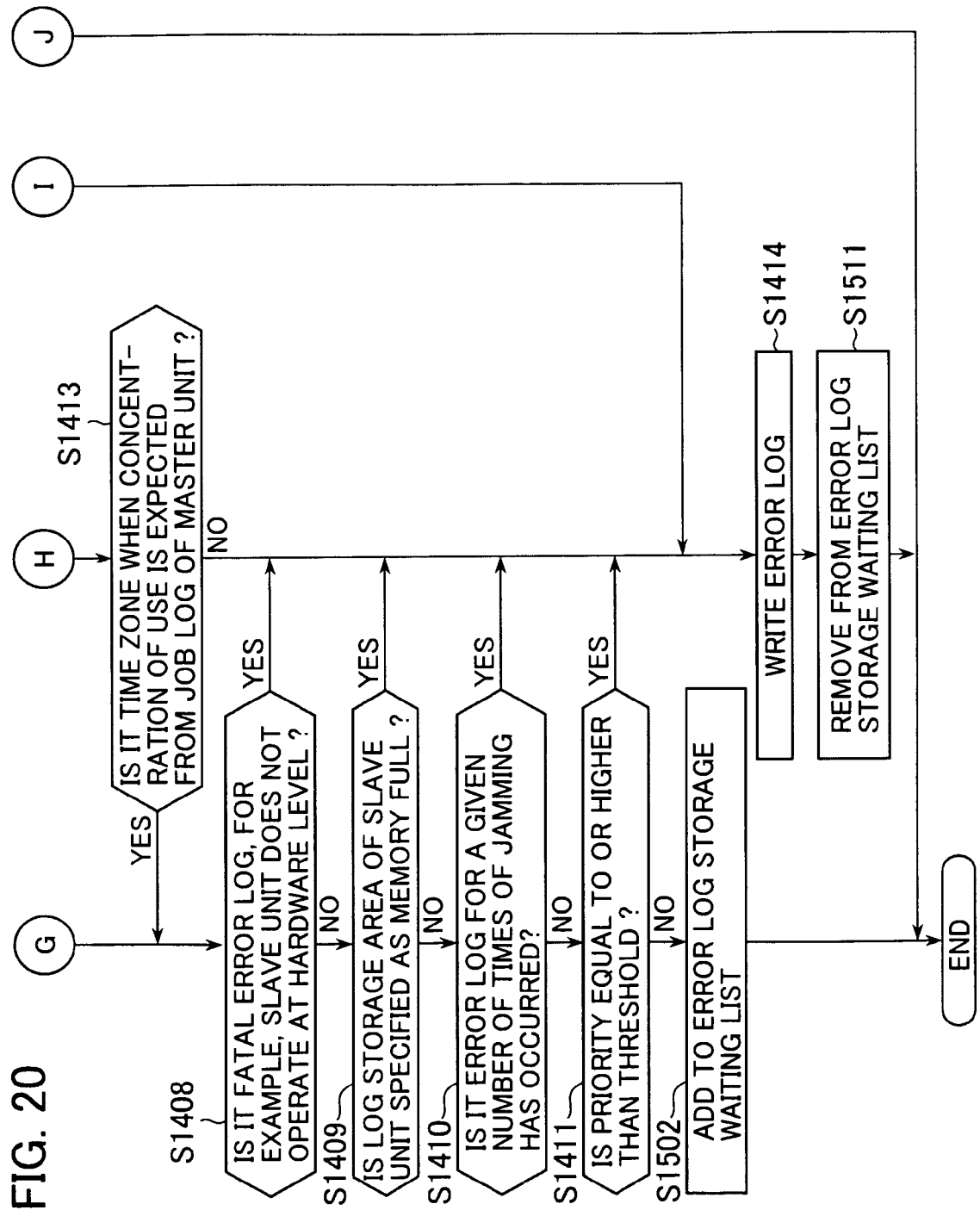
FIG. 20 is a flowchart continued from FIG. 19.

FIGS. 19 and 20 are flowcharts showing the flow of a process of determining which error log should be stored according to the third embodiment. Among processes shown in FIGS. 19 and 20, like numerals are assigned to the like processes in FIGS. 13, 17 and 18, and the description about them will be omitted. Each step in FIGS. 19 and 20 is performed by running a program expanded into the RAM 2002 from the ROM 2003 by the CPU 2001 of the master unit 601.

When the master unit 601 is not performing the function of the image forming apparatus, and when the concentration of the use of the master unit 601 is not expected, step S1901 is performed if there is no error log storage request from a slave unit 602 to 605 and the storage waiting list is not empty. In step S1901, the CPU 2001 uses the method of correcting priorities described above to correct the priorities of the slave units in the storage waiting list, then the process goes to step S1902.

In step S1902, the CPU 2001 selects the slave unit having the highest priority in the corrected priorities, then the process goes to step S1510. When there are a plurality of slave units having the same priority, one of them may be selected using the method described in connection with step S1506.

<Advantage of Third Embodiment>

According to the third embodiment, after the storage of an error log is postponed, the master unit 601 can store the error log of the slave unit when it is convenient for the master unit 601. That is to say, while the processing of the master unit 601 itself is not being performed, the master unit 601 can obtain the error log of the slave unit having the highest priority among the slave units whose error log storage was postponed. Thus, efficient error log storage can be performed.

[Alterations]

Although the embodiments of the present invention have been described, the present invention is not limited thereto, and various alterations may be made.

(1) The second embodiment or the third embodiment described above may be combined with the scheme for instructing to retransmit described in connection with the first embodiment. That is to say, when the error log storage of a predetermined slave unit is postponed, a master unit instructs the slave unit to retransmit the error log storage request, as well as adding information on the slave unit to a storage waiting list. In this case, when the master unit 601 is not performing the function of the image forming apparatus and the concentration of the use is not expected before the retransmission of the error log storage request by the slave unit, the master unit fetches the error log of the slave unit in the storage waiting list. Such a mode may be achieved by combining the flowcharts in FIGS. 13, 17, 18, 19 and 20.

(2) In the first embodiment, when the error log storage request of the slave unit is rejected by the master unit, the slave unit sets an urgent flag and requests the master unit to store the error log by priority as long as the log memory is full. Without using such an urgent flag, the slave unit may lock its operation panel so that the slave unit itself cannot serve as the image forming apparatus until the error log is obtained by the master unit.

(3) When the same errors occur in the slave unit several times, the following processing may be performed. That is to say, if the master unit rejects the error log storage request from the slave unit many times, similar error logs are recorded in the log memory of the slave unit many times, and then the log memory may become full soon. Thus, when an error log regarding a first error has already be recorded in the log memory, from the second time onward of the same error, the slave unit writes the simplified error log into the log memory with the level of the error being lowered. The simplified error log indicates the error log which is the same as the error log recorded before. Thus, the log memory of the slave unit may be prevented from being full.

On the contrary, when the same error occur several times, the slave unit may increase the level of the error more than usual to obtain a detailed error log, and writes it into the log memory, in order to facilitate investigating the cause of the error. At the same time, the slave unit may cause the memory full condition of the log memory early, and facilitate sending out the error log storage request with an urgent flag so as to have the master unit store the error log as soon as possible.

(4) Although an image forming apparatus has been described as a processing apparatus in accordance with the present invention, the present invention is not limited thereto, and the present invention may be widely applied to devices having a function of providing services. For example, the image forming apparatus may be replaced by a configuration where a scanner, a printer and so on are connected to a server so as to have the same function as the image forming apparatus.

(5) It is to be understood that the object of the present invention may also be accomplished by supplying a system or an apparatus with a storage medium in which a program code of software which realizes the functions of the above described embodiments is stored, and causing a computer (or CPU of MPU) of the system or apparatus to read out and execute the program code stored in the storage medium.

In this case, the program code itself read from the storage medium realizes the functions of any of the embodiments described above, and the program code and the storage medium in which the program code is stored configure the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiments may be accomplished not only by executing the program code read out by a computer, but also by causing an OS (operating system) or the like which runs on the computer to perform a part or all of the actual operations based on instructions of the program code.

Further, it is to be understood that the functions of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions as follows.

This application claims priority from Japanese Patent Application No. 2008-96352 filed Apr. 2, 2008, which is hereby incorporated by reference herein in its entirety

What is claimed is:

1. A processing apparatus, which is connectable with a plurality of external processing apparatuses for sending a first log including information on frequency of usage and a second log including information on an error, and collecting the first and second logs from the external processing apparatuses, the processing apparatus comprising:
   a receiving unit adapted to receive the first log sent from each of the external processing apparatuses;
   a calculation unit adapted to calculate a priority of each the external processing apparatuses based on an operating situation of each of the external processing apparatuses determined from the first log received by said receiving unit; and
   a determination unit adapted to determine whether or not the second log sent by each of the external processing apparatuses should be stored based on the priority calculated by said calculation unit.

2. The processing apparatus according to claim 1, further comprising:
   a judgment unit adapted to judge an operating condition of the processing apparatus itself, and;
   a correction unit adapted to correct the priority based on the operating condition judged by said judgment unit,
   wherein said determination unit determines whether or not the second log should be stored based on the priority corrected by said correction unit.

3. The processing apparatus according to claim 2, further comprising:
   an operation unit adapted for an operator to enter job information,
   wherein said correction unit corrects the priority when said operation unit is being operated.

4. The processing apparatus according to claim 2, wherein said correction unit corrects the priority based on a type of a job, which is being processed by the processing apparatus itself.

5. The processing apparatus according to claim 1, further comprising:
   a storage unit adapted to store a log including information on the frequency of usage of the processing apparatus itself;
   a computing unit adapted to analyze the log stored in said storage unit to calculate the frequency of usage of the processing apparatus itself for each time zone; and
   a storage rejection unit adapted to reject a second log storage request from each of the external processing apparatuses when the frequency of usage at the current time calculated by said computing unit is equal to or greater than a given threshold.

6. The processing apparatuses according to claim 5, wherein said storage rejection unit has a retransmission instruction unit adapted to instruct each of the external processing apparatuses, when the second log storage request is rejected, to retransmit the second log storage request at a time zone when the frequency of usage of the processing apparatus determined by said computing unit is less than a given threshold.

7. The processing apparatus according to claim 5, wherein the second log storage request includes an urgent flag indicating that the second log is to be stored by priority.

8. The processing apparatus according to claim 5, wherein said storage rejection unit comprises:
   an update unit adapted to, when the second log storage request has been rejected, add the external processing apparatus whose second log storage request was rejected, to a log storage waiting list in which the external processing apparatuses whose second log storage was postponed are listed so that update the log storage waiting list;
   a selection unit adapted to select the external processing apparatus from the log storage waiting list; and
   an obtaining unit adapted to obtain the second log of the external processing apparatus selected by said selection unit,
   wherein the second log obtained by said obtaining unit is stored in the storage unit.

9. The processing apparatus according to claim 8, wherein whether or not said obtaining unit should be operated is determined based on an operating condition of the processing apparatus and the frequency of usage at the current time determined by said computing unit.

10. The processing apparatus according to claim 8, wherein said selection unit selects the external processing apparatuses based on the priority calculated by said calculation unit.

11. The processing apparatus according to claim 10, further comprising a correction unit adapted to correct the priority used by said selection unit to select the external processing apparatuses from the log storage waiting list.

12. The processing apparatus according to claim 11, wherein said correction unit corrects the priority based on the number of second log storage requests.

13. The processing apparatus according to claim 11, wherein said correction unit corrects the priority based on the time when the second log storage request was issued.

14. A control method for a processing apparatus, which is connectable with a plurality of external processing apparatuses for sending a first log including information on frequency of usage and a second log including information on an error, and collecting the first and second logs from the external processing apparatuses, the control method comprising:
   a receiving step of receiving the first log sent from each of the external processing apparatuses;
   a calculation step of calculating a priority of each of the external processing apparatuses based on an operating situation of each of the external processing apparatuses determined from the first log received in said receiving step; and
   a determination step of determining whether or not the second log sent by each of the external processing apparatuses should be stored based on the priority calculated in said calculation step.

15. A non-transitory storage medium storing a computer readable control program executable by a processing apparatus, which is connectable with a plurality of external processing apparatuses for sending a first log including information on frequency of usage and a second log including information on an error, and collecting the first and second logs from the external processing apparatuses, to execute a control method comprising:

a receiving step of receiving the first log sent from each of the external processing apparatuses;

a calculation step of calculating a priority of each of the external processing apparatuses based on an operating situation of each of the external processing apparatuses determined from the first log received in said receiving step; and a determination step of determining whether or not the second log sent by each of the external processing apparatuses should be stored based on the priority calculated in said calculation step.

\* \* \* \* \*